(12) United States Patent
Hanai et al.

(10) Patent No.: US 8,103,557 B2
(45) Date of Patent: Jan. 24, 2012

(54) ONLINE MERCHANDISING SYSTEM, ONLINE CATALOG PRESENTING METHOD, SERVER, COMPUTER PROGRAM PRODUCT, AND COMPUTER DATA SIGNAL

(75) Inventors: Atsushi Hanai, Kawasaki (JP); Hiroshi Fushimi, Tokyo (JP); Sachiko Misumi, Tokyo (JP); Keisuke Kataoka, Yokohama (JP); Maki Satoh, Hadano (JP); Eiji Shinohara, Kawasaki (JP); Hiroaki Ono, Tokyo (JP); Noriko Yamane, Tokyo (JP); Atsumi Otsuka, Tokyo (JP); Keiko Sakita, Tokyo (JP); Kohichi Yuasa, Tokyo (JP); Keiichi Itoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1653 days.

(21) Appl. No.: 10/349,182

(22) Filed: Jan. 23, 2003

(65) Prior Publication Data

US 2003/0139976 A1 Jul. 24, 2003

(30) Foreign Application Priority Data

Jan. 23, 2002 (JP) ................................. 2002-014810

(51) Int. Cl.
*G06Q 20/00* (2006.01)
*G06Q 30/00* (2006.01)

(52) U.S. Cl. ............................... 705/27; 705/26; 705/20

(58) Field of Classification Search .................... 705/26, 705/27, 20
See application file for complete search history.

(56) References Cited

U.S. PATENT DOCUMENTS 5,873,069 A * 2/1999 Reuhl et al. ..................... 705/20
6,076,070 A * 6/2000 Stack .............................. 705/20

(Continued)

FOREIGN PATENT DOCUMENTS

JP 11-031184 2/1999

(Continued)

OTHER PUBLICATIONS

Keep them Happy and Coming Back for More.(Industry Trend or Event) Ziff Davis Smart Business for the New Economy, p. 142 Sep. 1, 2000.*

(Continued)

*Primary Examiner* — Elaine Gort
*Assistant Examiner* — Ashford S. Hayles
(74) *Attorney, Agent, or Firm* — Morrison & Foerster LLP

(57) ABSTRACT

The shopping server provides an online shopping service with retrieving information of items handled, relations among the items, user's purchase history, user's request, and the like via the internet or the intrafirm network. The shopping server generates electronic catalogs personalized for each user based on the retrieved information so as to show useful and helpful information to each user. The catalogs are categorized in accordance with the purposes. Some of the categories are fulfilled by the automatic entry in accordance with the item relations or the user's purchase through the online shopping service, while the others are fulfilled by the user's arbitrary designation. The shopping server presents the generated catalogs to the users via the internet, so that the categories are switchable and customizable by the user.

17 Claims, 33 Drawing Sheets

U.S. PATENT DOCUMENTS

| | | | |
|---|---|---|---|
| 6,434,530 B1* | 8/2002 | Sloane et al. | 705/26.62 |
| 6,574,608 B1* | 6/2003 | Dahod et al. | 705/26.41 |
| 6,578,030 B1* | 6/2003 | Wilmsen et al. | 707/3 |
| 6,604,088 B1* | 8/2003 | Landom et al. | 705/26 |
| 6,745,636 B2* | 6/2004 | Rainin et al. | 73/864.16 |
| 6,754,636 B1* | 6/2004 | Walker et al. | 705/26 |
| 6,873,967 B1* | 3/2005 | Kalagnanam et al. | 705/26.44 |
| 6,970,840 B1* | 11/2005 | Yu et al. | 705/27 |
| 7,013,290 B2* | 3/2006 | Ananian | 705/27 |
| 7,035,816 B2* | 4/2006 | Jankelewitz | 705/26 |
| 7,082,426 B2* | 7/2006 | Musgrove et al. | 707/3 |
| 7,099,833 B1* | 8/2006 | Sundaresan | 705/26 |
| 7,216,093 B1* | 5/2007 | Gupta et al. | 705/26.62 |
| 7,356,490 B1* | 4/2008 | Jacobi et al. | 705/26.8 |
| 7,493,274 B2* | 2/2009 | Bezos et al. | 705/26.8 |
| 7,506,028 B2* | 3/2009 | Mohr | 709/206 |
| 7,584,135 B1* | 9/2009 | McAllister et al. | 705/37 |
| 7,716,084 B2* | 5/2010 | Van Etten et al. | 705/26.4 |
| 2001/0005833 A1* | 6/2001 | Asami et al. | 705/26 |
| 2001/0014868 A1* | 8/2001 | Herz et al. | 705/14 |
| 2001/0032142 A1* | 10/2001 | Jeon et al. | 705/26 |
| 2002/0002531 A1* | 1/2002 | Lustig et al. | 705/37 |
| 2002/0007322 A1* | 1/2002 | Stromberg | 705/26 |
| 2002/0010654 A1* | 1/2002 | Yonezawa et al. | 705/27 |
| 2002/0053076 A1* | 5/2002 | Landesmann | 725/10 |
| 2002/0059196 A1* | 5/2002 | I'Anson et al. | 707/3 |
| 2002/0099642 A1* | 7/2002 | Schwankl et al. | 705/37 |
| 2002/0111863 A1* | 8/2002 | Landesmann | 705/14 |
| 2002/0147674 A1* | 10/2002 | Gillman | 705/37 |
| 2002/0156686 A1* | 10/2002 | Kraft et al. | 705/26 |
| 2002/0161658 A1* | 10/2002 | Sussman | 705/26 |
| 2002/0178013 A1* | 11/2002 | Hoffman et al. | 705/1 |
| 2003/0005046 A1* | 1/2003 | Kavanagh et al. | 709/203 |
| 2003/0028394 A1* | 2/2003 | Alzer et al. | 705/1 |
| 2003/0033205 A1* | 2/2003 | Nowers et al. | 705/26 |
| 2003/0065805 A1* | 4/2003 | Barnes, Jr. | 709/231 |
| 2003/0083961 A1* | 5/2003 | Bezos et al. | 705/27 |
| 2003/0115114 A1* | 6/2003 | Tateishi et al. | 705/26 |
| 2003/0167209 A1* | 9/2003 | Hsieh | 705/26 |
| 2003/0200156 A1* | 10/2003 | Roseman et al. | 705/27 |
| 2003/0204447 A1* | 10/2003 | Dalzell et al. | 705/26 |
| 2003/0204449 A1* | 10/2003 | Kotas et al. | 705/27 |
| 2003/0220835 A1* | 11/2003 | Barnes, Jr. | 705/14 |
| 2003/0233278 A1* | 12/2003 | Marshall | 705/14 |
| 2004/0010456 A1* | 1/2004 | Hoang | 705/27 |
| 2004/0015415 A1* | 1/2004 | Cofino et al. | 705/26 |
| 2004/0225569 A1* | 11/2004 | Bunnell | 705/26 |
| 2005/0010857 A1* | 1/2005 | Shmukler et al. | 715/500 |
| 2005/0091127 A1* | 4/2005 | Saltel et al. | 705/27 |
| 2005/0154652 A1* | 7/2005 | Bezos et al. | 705/27 |
| 2005/0177474 A1* | 8/2005 | Ma | 705/30 |
| 2005/0197927 A1* | 9/2005 | Martineau et al. | 705/27 |
| 2008/0077508 A1* | 3/2008 | Bezos et al. | 705/27 |
| 2008/0228592 A1* | 9/2008 | Kotas et al. | 705/26 |
| 2008/0243644 A1* | 10/2008 | Bezos et al. | 705/27 |
| 2009/0138380 A1* | 5/2009 | Roseman et al. | 705/27 |

FOREIGN PATENT DOCUMENTS

| | | |
|---|---|---|
| JP | 11-338927 | 12/1999 |
| JP | 2000-020591 | 1/2000 |
| JP | 2001-022824 | 1/2001 |
| JP | 2001-022847 | 1/2001 |
| JP | 2001-312658 | 11/2001 |
| JP | 2002-056312 | 2/2002 |

OTHER PUBLICATIONS

Japanese Office Action, mailed on Dec. 4, 2007, directed to counterpart Japanese Application No. 2002-337249. 1 page.

Japanese Office Action dated Sep. 4, 2007, directed to counterpart JP application No. 2002-337249.

* cited by examiner

CUSTOMER DB 211

CUSTOMER DATA (TOKYO SERVICE CENTER)

| ID | CUSTOMER NAME | ADDRESS | CATEGORY | GRADE | SALES AGENT | RECOMMENDED ITEM | OUR MESSAGE | DEST. CODE | AREA CODE |
|---|---|---|---|---|---|---|---|---|---|
| 00001 | Mr. A | Tokyo, JP | Business (ID: 001A) | A | aa | Copy&Fax A123 | Your office... | K1111 | T01 |
| 00002 | Ms. B | Tokyo, JP | Private | C | bb | Printer C332 | Our new... | K5432 | T09 |
| ... | ... | ... | ... | ... | ... | ... | ... | ... | ... |

FIG. 3A

SALES DB 212

| DATE | DEAL ID | ITEM | QT. | PRICE | TOTAL | BUYER (ID) | SALES STAFF | ... |
|---|---|---|---|---|---|---|---|---|
| Jan.1 | 1 | A123 | 1 | ¥10,000 | ¥11,300 | 01001 | aa | ... |
| | | C233 | 1 | ¥1,000 | | | | |
| | | X987 | 3 | ¥100 | | | | |
| ⋮ | ⋮ | ⋮ | ⋮ | ⋮ | ⋮ | ⋮ | ⋮ | ... |
| ⋮ | ⋮ | ⋮ | ⋮ | ⋮ | ⋮ | ⋮ | ⋮ | ... |

FIG. 3B

INVOICE DB 213

| Invoice for "AAA Co.,Ltd." [JANUARY] | | | | | by aa of Tokyo SC | |
|---|---|---|---|---|---|---|
| DATE | ITEM | QUANTITY | PRICE | ORDERED BY | BY ONLINE? | ... |
| Jan.1 | A123, A321 | 1 | ¥1,100,000 | Mr. A | YES | ... |
| Jan.2 | B321 | 2 | ¥1,000 | Ms. C | NO | ... |
| ⋮ | ⋮ | ⋮ | ⋮ | ⋮ | ⋮ | ... |

FIG. 3C

ITEMS (MASTER DB 231)

| ITEM CODE | MODEL | CATEGORY | SUB CATEGORY | STANDARD PRICE | RELATED ITEMS | ... |
|---|---|---|---|---|---|---|
| A123 | "NE333" | Completed Item | Copier | ¥987,654 | Option B991<br>Supply C203 | ... |
| ⋮ | ⋮ | ⋮ | ⋮ | ⋮ | ⋮ | ... |
| C203 | "TN-2000" | Supply Item | Toner | ¥9,876 | Comp. A123<br>Comp. A246 | ... |
| ⋮ | ⋮ | ⋮ | ⋮ | ⋮ | ⋮ | ... |

CUSTOMER (MASTER DB 232)

| ID | CUSTOMER NAME | ADDRESS | CATEGORY | GRADE | SALES AGENT | RECOMMENDED ITEM | OUR MESSAGE | DEST. CODE | AREA CODE |
|---|---|---|---|---|---|---|---|---|---|
| 00001 | Mr. A | Tokyo, JP | Business (ID: 001A) | A | aa (Tokyo SC) | Copy&Fax A123 | Your office.... | K1111 | T01 |
| 00002 | Ms. Z | Osaka, JP | Private | C | bb (Osaka SC) | Printer C332 | Our new.... | K5432 | T09 |
| ... | ... | ... | ... | ... | ... | ... | ... | ... | ... |

*FIG. 5B*

ONLINE USER DB 251

| ID | NAME | LOGIN ACCOUNT | CATALOG FOLDERS ||||
| | | | "QUICK ORDER" | "WHAT I HAVE" | "PRICE WATCH" | "MY CATALOG" |
|---|---|---|---|---|---|---|
| 00001 | Mr. A | a@+++.com ******** | TC01, MC01 | CM01, DC01 | DIMM01:¥* *** | CM02, DC02 |
| 00002 | Ms. B | b@+++.com ******** | TC02, MC02 | CM02, DC02 | --- | DC03 |
| ... | ... | ... | ... | ... | ... | ... |

*FIG. 7*

SHIPPING PRIORITY DB 271

| DESTINATION CODE | DELIVERY CENTERS | | | | |
|---|---|---|---|---|---|
| | CENTER A | CENTER B | CENTER C | CENTER D | ... |
| K1111 (AREA T01) | 1 | | 2 | 3 | ... |
| K1234 (AREA T02) | 2 | 1 | 4 | 3 | ... |
| K2123 (AREA T04) | 1 | 2 | 9 | 6 | ... |
| K3131 (AREA T03) | 3 | 7 | 2 | | ... |
| ⋮ | ⋮ | ⋮ | ⋮ | ⋮ | ... |

*FIG. 9A*

ITEM AVAILABILITY DB 272

| ITEM CODE | DELIVERY CENTERS | | | | |
|---|---|---|---|---|---|
| | CENTER A | CENTER B | CENTER C | CENTER D | ... |
| A003 | AVAILABLE | AVAILABLE | N/A | AVAILABLE | ... |
| A321 | AVAILABLE | N/A | N/A | AVAILABLE | ... |
| A234 | AVAILABLE | AVAILABLE | N/A | N/A | ... |
| A172 | N/A | AVAILABLE | N/A | N/A | ... |
| ⋮ | ⋮ | ⋮ | ⋮ | ⋮ | ... |

*FIG. 9B*

SHIPPING LEAD-TIME DB 273

| AREA CODE | DELIVERY CENTERS | | | | |
|---|---|---|---|---|---|
| | CENTER A | CENTER B | CENTER C | CENTER D | ... |
| T01 | 1 DAY | | 2 DAYS | 2 DAYS | ... |
| T02 | 1 DAY | 1 DAY | 3 DAYS | 2 DAYS | ... |
| T03 | 2 DAYS | 4 DAYS | 1 DAY | | ... |
| T04 | 1 DAY | 1 DAY | 5 DAYS | 3 DAYS | ... |
| ⋮ | ⋮ | ⋮ | ⋮ | ⋮ | ... |

*FIG. 9C*

INVENTRY DB 274

| ITEM CODE | STOCK STATUS | LOT | NEXT ARRIVAL | SCHEDULED DATE | RESERVED LOT |
|---|---|---|---|---|---|
| A003 | In Stock | 100 | N/SCHEDULED | --- | --- |
| A321 | In Stock | 1 | N/SCHEDULED | --- | --- |
| A234 | Sold Out | --- | SCHEDULED | Jan. 25 | 20 |
| A172 | Sold Out | --- | N/SCHEDULED | --- | --- |
| ⋮ | ⋮ | ⋮ | ⋮ | ⋮ | ⋮ |

CATALOG SELECTOR

| ITEM | ITEM CODE | PRICE | NOTE |
|---|---|---|---|
| COPY PAPER | 11111 | | |
| TONER | 22222 | | |

SELECT FOLDER  — — — — — ▼

MY CATALOG
PRICE WATCH  ■

( ENTRY )    ( CANCEL )

GO TO SHOPPING PAGE>>

*FIG. 15*

CATALOG ENTRY (PRICE WATCH)

| ITEM | ITEM CODE | CURRENT PRICE | ASKING PRICE |
|---|---|---|---|
| COPY PAPER | 11111 | ¥6,500 | |
| TONER | 22222 | ¥3,700 | |

SELECT FOLDER  PRICE WATCH ▼

( ENTRY )  ( CANCEL )

GO TO SHOPPING PAGE>>

*FIG. 16*

ONLINE SHOPPING

Selected Item Page

You've Got 25,000 Points

ITEMS IN YOUR CART

| ITEM | ITEM CODE | QT. | NOTE | PT | UNIT PRICE | SUB TOTAL | |
|---|---|---|---|---|---|---|---|
| PRINTER P330 | 100049 | 3 | In Stock | 10000 | ¥200,000 | ¥600,000 | REMOVE |
| SCANNER SC50 | 100070 | 2 | In Stock | 10000 | ¥100,000 | ¥200,000 | REMOVE |
| CD-R/RW R50 | 100074 | 1 | In Stock | 10000 | ¥100,000 | ¥100,000 | REMOVE |
| | | | | | TOTAL | ¥900,000 | UPDATE TOTAL |

NOTE: Your total does not include Sales Tax and Shipping Charge.

[CONTINUE SHOPPING]  [ORDER]  [CANCEL]

*FIG. 18*

| CATALOG PAGE: "QUICK ORDER" | | | |
|---|---|---|---|
| Your Possession | Accesories/Supplies | Price | Qt. |
| COPY MACHINE (CM01) | TONER CARTRIDGE (TC01) | ¥,* | ☑ |
| | COPY PAPER (500 sheets/set) | ¥*,*** | ☐ |
| DIGITAL CAMERA (DC01) | MEMORY CARD (MC01) | ¥*,*** | ☐ |
| | BATTERY PACK (BT01) | ¥*,*** | ☑ |

BUY NOW   MENU

*FIG. 21*

| CATALOG PAGE: "PRICE WATCH" | | | |
|---|---|---|---|
| PRICE WATCH | | | |
| Target Item(s) | Your Asking Price | Current Price | Qt. |
| PC MEMORY MODULE (DIMM001) | ¥,* | ¥,* | ☐ ☑ |
| NOTE PC (NPC001) | ¥*,* | ¥*,* | ☐ ☐ |
| ⋮ | | | |
| [ BUY NOW ]   [ MENU ] | | | |

*FIG. 22*

CATALOG PAGE: "WHAT I HAVE"

WHAT I HAVE

COPY MACHINE (CM01)
DETAILS  SUPPLIES  OPTIONS  USER SUPPORT
USER'S MANUALS  TIPS  UPGRADE  • • •

DIGITAL CAMERA (DC01)
DETAILS  SUPPLIES  OPTIONS  USER SUPPORT
USER'S MANUALS  TIPS  UPGRADE  • • •

CATALOG PAGE

MY CATALOG 1 | MY CATALOG 2 | MY CATALOG 3 | MY CATALOG 4 | MY CATALOG 5
WHAT I HAVE | PRICE WATCH | QUICK ORDER

QUICK ORDER
(Supplies applicable to your equipment or frequently bought items)

| ITEM | SALES PRICE | QUANTITY |
|---|---|---|
| ☐ Toner Cartridge for Copier | ¥\*\*,\*\*\* | 0 |
| ☐ Copy Paper | ¥\*\*,\*\*\* | 0 |
| ☐ Toner Cartridge for Printer | ¥\*\*,\*\*\* | 0 |
| ☐ ⋮ | ⋮ | ⋮ |

ORDER  
OB

CS

EDIT  
EB

ONLINE MERCHANDISING SYSTEM, ONLINE CATALOG PRESENTING METHOD, SERVER, COMPUTER PROGRAM PRODUCT, AND COMPUTER DATA SIGNAL

BACKGROUND OF THE INVENTION

1. Field of the Invention

The present invention relates to an online merchandising system and for electronic commerce (EC), which improves usability, and to an online catalog presenting method, a server, a computer program product, and a computer data signal embodied in a carrier wave for realizing the system.

2. Description of the Related Art

As growth of the Internet, "Online Shopping" based on EC technology becomes very popular way of shopping. Such the online shopping service is advantageous to handling various items, because the merchandiser can sell the items without backyard stocks unlike ordinary shop-based merchandising. Though variety of the items, users must go through several steps to find out a target item. It is said that the online shopping users tend to buy the same item constantly. Even if such the "frequenter", the user must go through the several steps to buy the item. Accordingly, the conventional online shopping services have required the users to have troublesome steps with extra connection time.

To overcome such the inconveniences, Unexamined Japanese Patent Application KOKAI Publication No. 2000-20591 discloses a technique by which a user terminal downloads information of items assigned by a user through the internet online shopping.

According to the above invention, the user can view the item information without establishing connection to the online shopping site, because the information has been downloaded beforehand. However, since it merely records the information on the user terminal, the usability is still unsatisfied. Moreover, once the information is recorded on the user terminal, there is no way to update the information. That is, the user may view out-of-date information. For example, it may show prices before price revision was done. In this case, the price may be fluctuated at a phase where the user buys the item concerned.

Unexamined Japanese Patent Application KOKAI Publication Nos. 2001-22824 and 2002-56312 disclose similar techniques for storing information regarding to the order (purchase) on the online shopping to be utilized for order cancellation or next order in the future.

In those techniques, information represents only items to be bought. In other words, the information lacks in showing relationship between the items concerned and others being associated to them. Therefore, if the user intends to buy those associated items, troublesome extra steps for selecting them are required.

The present invention has been made as a solution for the above inconveniences, and it is an object of the present invention to provide an online merchandising system, an online catalog presenting method, a server, a computer program product, and a computer data signal embodied in a carrier wave, those effective for improving the usability on the online shopping.

SUMMARY OF THE INVENTION

To achieve the above object, an online merchandising system according to a first aspect of the present invention is a system for an online shopping service using a telecommunications network comprising:

an item information storage for storing information of items to be merchandised;

an item information presenter for presenting the item information stored in the item information storage to a user of the online shopping service via the telecommunications network;

a catalog generator for generating user's own electronic catalogs; and a catalog presenter for presenting the electronic catalog to the user concerned via the telecommunications network.

The catalog generator may generate the user's own catalogs including information of the items designated by the user concerned.

The catalog generator may generates the user's own catalogs including information of the items in accordance with the purchase history of the user concerned.

The catalog generator may generate plural kinds of the user's own catalogs for each user, and the catalog presenter may present the plural kinds of the user's own catalogs so as to be switchable by the user concerned.

According to the above inventions, the system allows the users to have their own catalogs on the online shopping site.

To achieve the above objects, an online catalog presenting method according to a second aspect of the present invention is a method being applicable to an online shopping service, comprising the steps of:

storing information of items being handled by the online shopping service;

selecting items regarding to each user of the online shopping service from the stored items information;

generating plural kinds of catalogs personalized for each of the users to show information of the selected items; and presenting the generated catalogs to the users via a telecommunications network, so that the plural kinds of the catalogs are switchable by the user and the items shown in the presented catalog are purchasable by the user through the online shopping service.

The method may further comprise the step of detecting purchase history of each user, and the selecting step may select the items purchased by the user concerned through the online shopping service.

The method may further comprise the steps of:

detecting what items being owned by the users; and finding relations among the items handled by the online shopping service, and the selecting step may select the items relating to the items owned by the user concerned.

The method may further comprise the step of detecting purchase history of each user, and the selecting step may select items frequently purchased by the user concerned.

The selecting step may select the items in accordance with designation given by the user concerned via said telecommunications network.

The method may further comprise the steps of:

accepting user's designation of item and asking prices of the items concerned via said telecommunications network; and obtaining the current sales price information of the items designated by the user, and the generating step may generate a catalog which shows both the current sales prices and the user's asking prices so as to be comparable with each other.

The method may further comprise the steps of:

accepting users' designations of items and asking prices of the items via the telecommunications network;

obtaining the current sales price information of the items designated by the user;

comparing the current sales prices with the users' asking prices;

detecting the difference between the current sales price and the user's asking price whether the difference being within a predetermined range; and notifying the user that the sales price is close to the asking price when it is detected that the difference between the current sales price and the asking price being within the range with introducing a catalog showing both the current sales prices and the asking prices generated by the generating step.

The method may further comprise the step of updating stored item information, and the generating step may generate the catalogs based on the updated item information.

The presenting step may present the catalogs to the user so that the contents of the catalogs are exchangeable with each other by the user.

To achieve the above object, a server according to a third aspect of the present invention is a server applicable to a provider of an online shopping service using a telecommunications network, comprises:

an item information storage which stores information of items to be handled by the online shopping service;

a users' instruction accepting unit which accepts users' instructions given by user terminals of the users of the online shopping service via said telecommunications network, an item selecting unit which selects items regarding to users from the items represented by the information stored in the item information storage;

a selected item memory which stores information of the items selected by the item selecting unit with categorizing the information by the users;

a catalog generating unit which generates personalized electronic catalogs to be presented to the users through the online shopping service, showing items represented by the information stored in the selected item memory; and a catalog presenting unit which presents the personalized catalogs generated by the catalog generating unit to the user terminal concerned via the telecommunications network, so as to enable the user concerned to order the items shown in the presented catalog through the online shopping service.

In the above server, the users' instruction accepting unit may accept users' designation of items via the telecommunications network, the item selecting unit may select the items in accordance with the user's designation accepted by the users' designation accepting unit, and said catalog generating unit generates user's own catalogs of the selected items.

The server may further comprise a purchase detecting unit which detects purchases of the users through the online shopping service, wherein, the item selecting unit may select items in accordance with the purchases of the users detected by the purchase detecting unit, and the catalog generating unit may generate a personalized catalog showing purchase history of the user concerned.

The server may further comprise:

a possession detecting unit which detects what items owned by the users; and an item linking unit which links items with relational items in the item information storage, wherein, the catalog generating unit may generate a personalized catalog showing the relational items linked to the items owned by the user concerned.

The server may further comprise:

a users' designation accepting unit which accepts users' designation of items and asking prices of the items concerned via the telecommunications network; and a price monitoring unit which obtains the current sales price information of the items designated by the user, wherein, the catalog generating unit may generate a personalized catalog showing the current sales prices and the user's asking prices comparable with each other.

The item information storage may constantly update the item information therein, the selected item memory may update the selected item information in accordance with the update by the item information storage, and the catalog generating unit may generate the personalized catalogs showing the latest item information.

The catalog presenting unit may present the personalized catalogs to the terminal devices of the users so that the contents of the catalogs are customizable by the users, and the selected item memory may further categorize the information into plural kinds of the catalogs to be generated by the catalog generating unit, and updates the information in accordance with the customization by the users.

The users' instruction accepting unit may accept a user's order instruction through the catalog presented by the catalog presenting unit, and the selected item memory may update the selected item information in accordance with the order instruction accepted by the users' instruction accepting unit.

The item information storage may constantly update the item information therein so that the item information represents the current sales prices of the items;

the users' instruction accepting unit may accept user's designation of items and asking prices of the items concerned;

the catalog generating unit may generate a price comparison catalog showing both the current sales prices and the user's asking prices of the items designated by the user concerned, and the catalog presenting unit may present the price comparison catalog the user terminal of the user concerned when the current sales prices are close to the user's asking prices.

To achieve the above object, a computer program product according to a fourth aspect of the present invention is a computer program product storing a program which functions a computer as an online merchandising server for providing a online shopping service via a telecommunications network, comprises:

a user information handler for storing information of users of the online shopping service, accepting users' instructions from user terminals being connected to the telecommunications network, and updating the user information in accordance with the users' instructions;

an item information handler for storing information of items to be merchandized through the online shopping service with updating the information constantly, and for selecting items in accordance with the user's instruction or the updated user information handled by the user information handler with categorizing the selected items, and;

a catalog handler for generating categorized electronic catalogs for each user to show items selected by the item information handler, and for presenting the generated catalogs to the user terminals so that the catalog categories are switchable and customizable by the users.

To achieve the above object, a computer data signal according to a fifth aspect of the present invention is a computer data signal embodied in a carrier wave to be downloadable to a computer, by which the computer functions as an online merchandising server for providing an online shopping service via a telecommunications network comprises:

a user information handler for storing information of users of the online shopping service, accepting users' instructions from user terminals being connected to the telecommunications network, and updating the user information in accordance with the users' instructions;

an item information handler for storing information of items to be merchandized through the online shopping service with updating the information constantly, and for selecting items in accordance with the user's instruction or the updated user information handled by the user information handler with categorizing the selected items, and;

a catalog handler for generating categorized electronic catalogs for each user to show items selected by the item information handler, and for presenting the generated catalogs to the user terminals so that the catalog categories are switchable and customizable by the users.

BRIEF DESCRIPTION OF THE DRAWINGS

These objects and other objects and advantages of the present invention will become more apparent upon reading of the following detailed description and the accompanying drawings in which:

FIG. 3A is a diagram exemplifying "Customer Data" in the in-shop DB system:

FIG. 3B is a diagram exemplifying "Sales Data" in the in-shop DB system;

FIG. 3C is a diagram exemplifying "Invoice Data" in the in-shop DB system;

FIG. 5B is a diagram exemplifying "Customer Data" in the master DB system;

FIG. 7 is a diagram exemplifying "Online User Data" in the shopping DB system;

FIG. 9A is a diagram exemplifying "Shipping Priority Data" in the shipment DB system;

FIG. 9B is a diagram exemplifying "Merchandise Availability Data" in the shipment DB system;

FIG. 9C is a diagram exemplifying "Shipping Lead-time Data" in the shipment DB system;

FIG. 9D is a diagram exemplifying "Inventory Data" in the shipment DB system;

FIG. 12 is a diagram exemplifying "Personalized Page" to be displayed on the user terminal;

FIG. 15 is a diagram exemplifying "Catalog Selector Page" to be displayed on the user terminal;

FIG. 16 is a diagram exemplifying "Catalog Entry Page" to be displayed on the user terminal;

FIG. 18 is a diagram explaining "Selected Item Page" to be displayed on the user terminal;

FIG. 21 is a diagram exemplifying "Catalog Page (Quick Order)" to be displayed on the user terminal;

FIG. 22 is a diagram exemplifying "Catalog Page (Price Watch)" to be displayed on the user terminal;

FIG. 23 is a diagram exemplifying "Catalog Page (What I Have)" to be displayed on the user terminal;

FIG. 25B is a diagram exemplifying "Catalog Page (Quick Order)" to be displayed on the user terminal, according to a second embodiment of the present invention;

DETAILED DESCRIPTION OF THE PREFERRED EMBODIMENTS

Preferred embodiments of the present invention will now be described with referring to accompanying drawings.

First Embodiment

Figure 1:
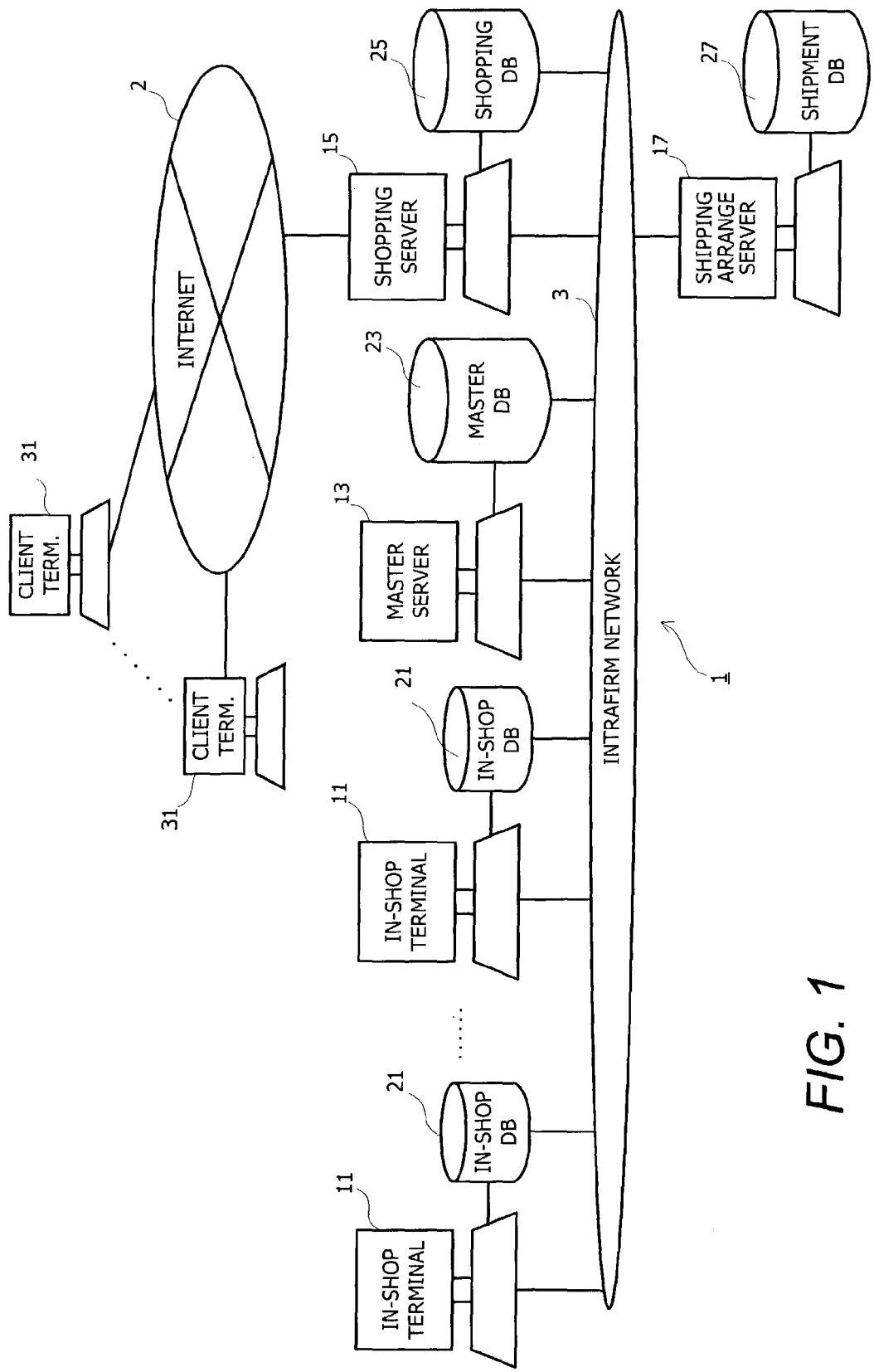
FIG. 1 is a diagram showing the structure of "Online Merchandising System" according to the embodiments of the present invention.

FIG. 1 is a diagram schematically showing the structure of an online merchandising system according to the embodiment.

As shown in FIG. 1, the online merchandising system comprises an intrafirm online merchandising system 1 (closed network), the Internet 2 (open network), and client terminals 31. The intrafirm online merchandising system 1 may be owned by a business body (company, enterprise, organization, or the like) which has an online shopping site (hereinafter, referred to as "merchandiser").

The intrafirm online merchandising system 1 comprises an intrafirm network 3 (intranet) which interconnects a plurality of in-shop terminals 11 (being coupled with in-shop DB systems 21 respectively), a master server 13 (being coupled with a master DB system 23), a shopping server 15 (being coupled with a shopping DB system 25), and a shipping arrange server 17 (being coupled with a shipment DB system 27) to each other.

Figure 2:
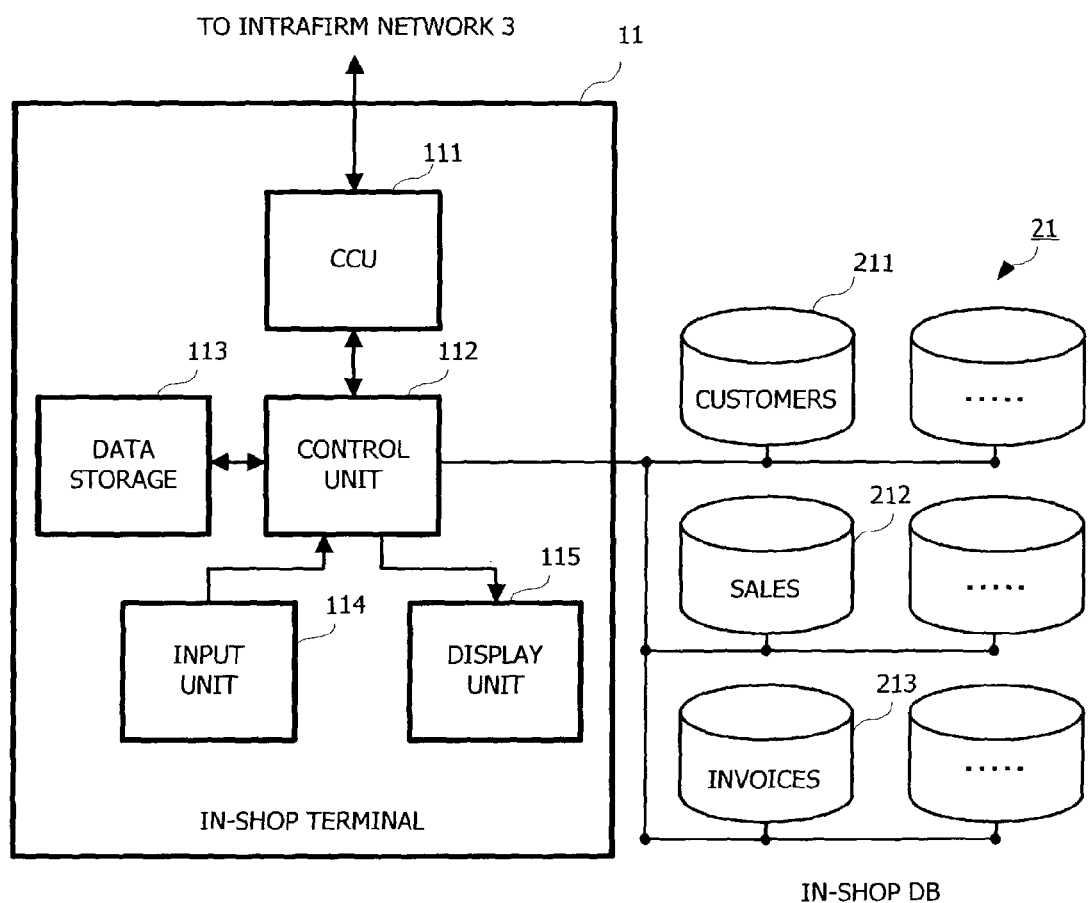
FIG. 2 is a diagram showing the structure of a set of "In-Shop Terminal" and "In-Shop DB system" which is installed in each shop.

The in-shop terminals 11 are installed in authorized distributors, retailers, service centers and the like (hereinafter referred to as "shops") owned by or affiliated with the merchandiser. The in-shop terminal 11 processes business tasks in the shop concerned. FIG. 2 shows the typical structure of the in-shop terminal 11 and in-shop DB system 21.

As shown in FIG. 2, the in-shop terminal 11 comprises a communications control unit (CCU) 111, a control unit 112, a data storage unit 113, an input unit 114, and a display unit 115.

The CCU 111 works as interface to the intrafirm network 3 under control of the control unit 112 to establish connections to the master server 13 and the like for data communications.

The control unit 112 controls whole components in the in-shop terminal 11 to execute any data processing tasks for the business. For example, the control unit 112 controls the CCU 111 to establish data communications with other servers (the master server 13 and the like), in accordance with instructions given through the input unit 114, and generates image data to be supplied to the display unit 115.

The data storage unit 113 may be semiconductor memory modules, disk drives, or the like, and stores data and programs.

The input unit 114 comprises a keyboard, pointing devices, and the like, to input commands, data, and the like given by the operator.

The display unit 115 comprises a monitor, a video memory, and the like for displaying images in accordance with the image data from the control unit 112 to present (output) information.

The in-shop DB system 21 comprises databases 211-213 for storing customer data, sales data, and invoice data, respectively.

As shown in FIG. 3A, the DB 211 stores information regarding to the customers of the shop concerned. The information may include Customer ID, User Name, Address, User Category ("Business User" (company ID affixed) or "Private User"), Customer Grade, Sales Agent, Recommended Items, Messages from the sales agent, destination code, area code, and the like.

"Customer ID" shows a unique ID assigned to each customer. "Customer Grade" represents rating of the customers which determined by the sales agent. The grade will be reflected to discount rate, discount coupons, or the like. "Recommended Items" shows items now recommended by the sales agent. "Message" may shows greeting messages from the sales agent. "Destination Code" and "Area Code" represents state, prefecture, city or the like, to specify destination for delivery. In addition to the table shown in FIG. 3A, the DB 211 also stores data regarding to the business customers (not shown). The data are categorized into records each for a company (enterprise), to which a unique company code (company ID) is assigned. Each of the records includes information regarding to persons who deal with purchasing affairs.

As shown in FIG. 3B, the DB 212 stores sales data. The data are categorized into records each for a unit of dealing. Each record includes information of: item code, quantity, and price of sold merchandises; buyer (customer ID); sales agent; and the like. Because the data are categorized by dealing unit, it is helpful for easy search for the sold items.

As shown in FIG. 3C, the DB 213 stores data of invoices (debit notes) issued monthly. The data are categorized into records each for a customer. Each of the records includes information of: dealing date; item code, quantity, and price (sales price) of bought item; person in charge of ordering; and the like. In this embodiment, the invoices for the business users are issued by the shops even if the purchases are done by the online shopping. Therefore, the invoice data include information for distinguishing whether the dealing is done by the online shopping or not ("Online User?" in FIG. 3C).

The master server 13 and the master DB system 23 shown in FIG. 1 collaborates with each other to handle whole the business tasks of the merchandiser.

Figure 4:
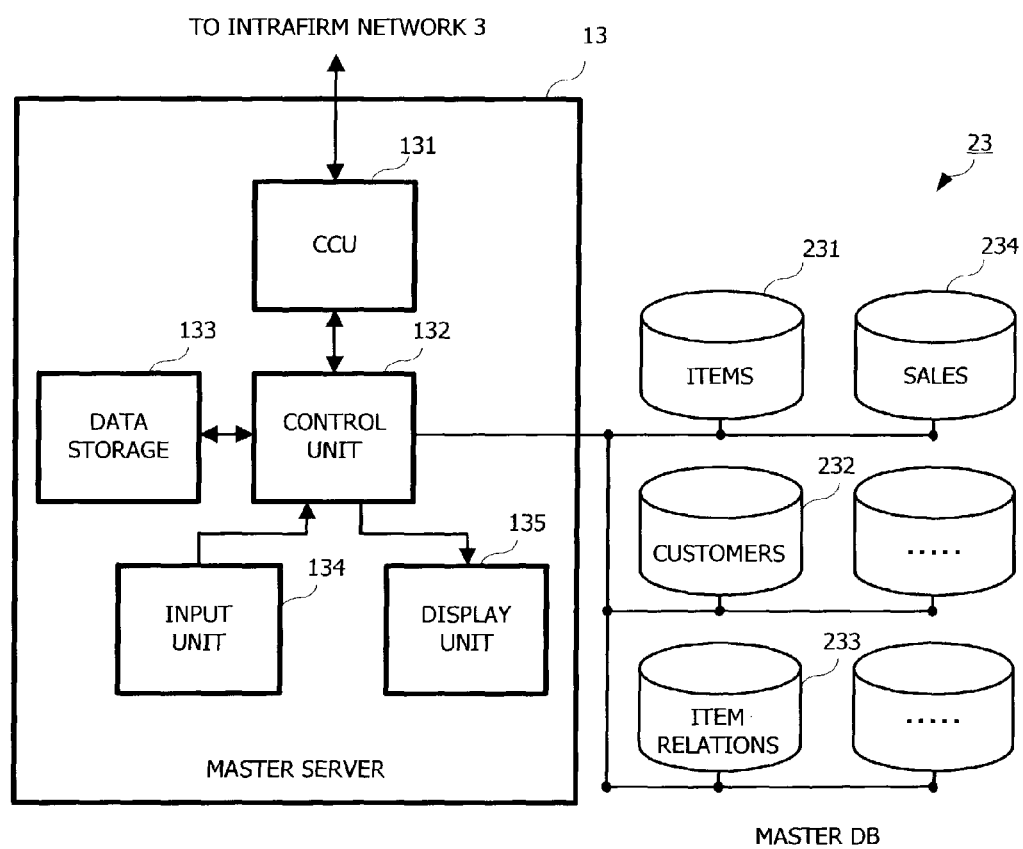
FIG. 4 is a diagram showing the structure of a set of "Master Server" and "Master DB system"

As shown in FIG. 4, the master server 13 comprises a communications control unit (CCU) 131, a control unit 132, a data storage unit 133, an input unit 134, and a display unit 135. Those components except the control unit 132 have the structures and functions which are the same as those of the corresponding components in the in-shop server 11. The control unit 132 is equipped with extra functions necessary for handling the tasks of whole business in the merchandiser.

The master DB system 23 stores collected data regarding to the whole business. As shown in FIG. 4, the master DB system 23 includes databases 231-234 each storing information of "Items", "Customers", "Item Relations", and "Sales" respectively.

Figures 5A, 5C:
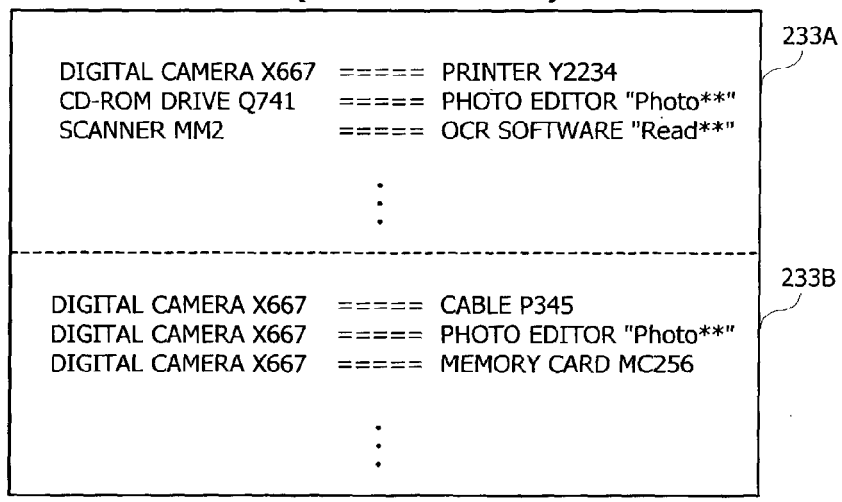
FIG. 5A is a diagram exemplifying "Item Data" in the master DB system.
FIG. 5C is a diagram exemplifying "Item Relation Data" in the master DB system.

As shown in FIG. 5A, the DB 231 stores data of all items the merchandiser handles. The data include information of: "Item Code", "Model", "Category", "Sub Category", "Standard Price", "Related Items", and the like. "Category" represents categories of each listed item. That is, the items may be categorized to, for example, "Completed Item", "Option Item", and "Supply Item". "Completed Item" represents items each of which has necessary functions as a whole to fulfil its purpose by itself. "Option Item" stands for items each of which is useless by itself, but collaborates with a certain completed item to provide it of extra functions. "Supply Item" means items to be used in the completed item or optional item, and those are exhausted through daily use. For example, in case of "Copier", the copier itself belongs to "Completed Item". An ADF (Automatic Document Feeder) unit, a sorter unit, a telecommunication unit, an extra power unit, and the like may belong to "Option Item", because those items are installed in or attached to the copier for use. And, a toner cartridge, copy paper, and the like may belong to "Supply Item". In case of "Digital Camera", the digital camera itself is in "Completed Item" category. A cable which connects the digital camera to a PC, a software package for transferring images to the PC, and the like may be in "Option Item" category. And, a battery pack, a memory card, and the like may be in "Supply Item" category.

"Related Items" represents other items belonging to other categories but are compatible with the item concerned. In a case where the item concerned is categorized to "Completed Item", item codes representing option items or supply items compatible with the completed item concerned are registered in "Related Items". In the same manner, if the item concerned is an option item, item codes of the corresponding completed items or supply items are registered. If the item concerned is supply item, item codes of the corresponding completed items or option items are registered. That is, data in "Related Items" are prepared reciprocally. In FIG. 5A, "C203" is registered as a related item of "A123" and vice versa.

Since it has such the relational database structure, once a target item is specified, the related items are also specified immediately, thus it is helpful for searching items. That is, it is able to search an item based on related items and vice versa, or based on categories.

The DB 232 stores information regarding to all customers of the merchandiser. That is, the DB 232 stores customer data collected from every in-shop DB systems 23.

As shown in FIG. 5C, the DB 232 stores information representing relations between a master item and other servant items being compatible with the master item. More precisely, the servant items are items which may be or should be bundled with the master item. In a case where a digital camera is purchased, for example, it is recommendable that a software package for retouching the captured photo images or a printer for printing the photo images is bundled with the digital camera. If the obviously recommendable relations are previously known, the operator of the master DB system 23 inputs information of such relations to an area 233A in the DB 233.

In addition to such the known relations, the market often reveals unpredicted relations in accordance with the customers' purchasing trend. In other words, if the trend shows that many customers tend to buy a certain item together with another certain item, and a relation between those items has not been registered, it means that a new relationship which has been unpredicted is found out. Such the relation should be registered as well as the registered known relations, because it reflects the actual customer' demand. Under such the situation, the control unit 132 checks the sales history to find out which item is often purchased together with another item. For example, the control unit 132 calculates the rate of bundling, and picks up items whose bundling rate exceeds a given threshold (for example, 5%). The control unit 132 registers information representing the relation between the picked up items in an area 233B in the DB 233.

The DB 234 stores data regarding to the whole sales of the merchandiser, that is, the data represents sales of all shops. The information stored in the DB 234 is fundamentally that stored in the DB 212 shown in FIG. 3B, that is, the information is distinguished by dealings. Therefore, the master server 13 can retrieve information representing bundled items from the data in the DB 234.

Figure 6:
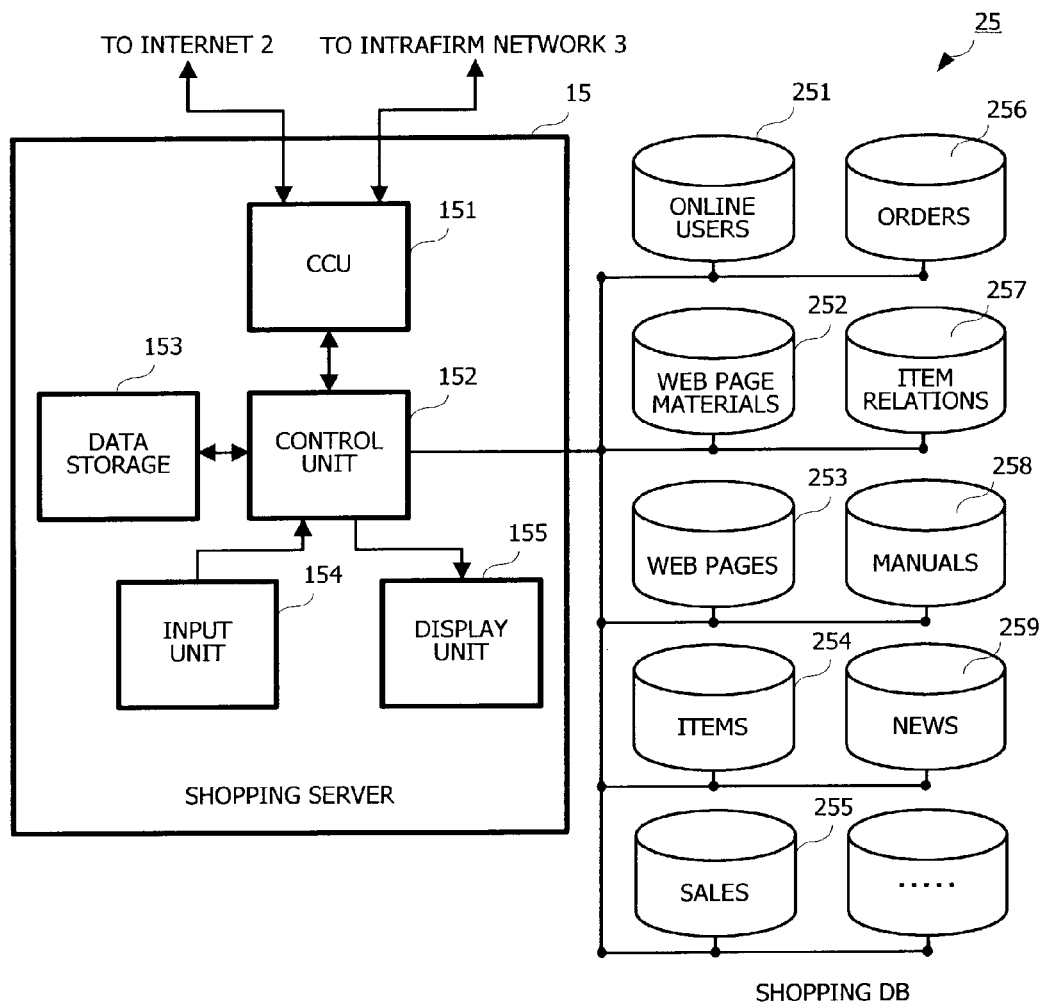
FIG. 6 is a diagram showing the structure of a set of "Shopping Server" and "Shopping DB system"

The shopping server 15 and the shopping DB system 25 collaborate with each other as a system to handle tasks for the online shopping. FIG. 6 shows the structures of them.

As shown in FIG. 6, the shopping server 15 comprises a communications control unit (CCU) 151, a control unit 152, a data storage unit 153, an input unit 154, and a display unit 155.

Those components except the control unit 152 have almost the same structures as those of the corresponding components in the in-shop terminal 11. The control unit 152 has extra functions for web page presentation and accounting tasks.

As shown in FIG. 6, the shopping DB system 25 comprises databases 251-258 for storing online user data, web page materials, web page data, item data, sales data, bill data, related items data, manual data, and news data, respectively.

As shown in FIG. 7, the DB 251 stores customer data of the users of the online shopping service. More precisely, the DB 251 stores the customer data stored in the master DB 232 shown in FIG. 5B. In addition to the customer data, the DB 251 stores login account and catalog folder information of each online users.

"Login Account" represents the user's e-mail address and password those coupled with each other to be required for user authentication when using the online shopping service.

"Catalog Folder" represents folders for user's own catalogs of the items handled by the online shopping service provided by the shopping server 15. The folders may include several catalog folders such as "Quick Order", "What I Have", "Price Watch", and "My Catalog".

"Quick Order" is a folder for additional items those may be categorized to "Option Item" or "Supply Item" and being applicable to "Completed Item" owned by the user concerned, and items frequently bought by the user. Information of those items will be entered automatically.

"What I Have" is a folder for the items owned by the user concerned. In other words, it represents purchase history of the user. In a case where the user purchases items by the online shopping service, information of those items are automatically registered in "What I Have" folder. If the user purchases items at the shop, the sales agent may register information of those items via the in-shop terminal 11.

"Price Watch" is a folder including user's target items for comparing asking price with the current sales price. More precisely, "Price Watch" folder includes information of target items and user's asking prices thereof those input by the user, while having information representing the current sales prices of those items collected by the shopping server 15.

"My Catalog" is a folder for user's arbitrary catalog. The user may be allowed to set a plurality "My Catalog" folders in accordance with the use or purpose. For example, one may be prepared for nominee items before buying while the other one includes items waiting for approval given by the supervisory officer.

According to the collaboration between the shopping server 15 and the master server 13, update or modification of item data in the master DB 231 will reflect to the item information in the catalog folders.

The DB 252 stores data representing various materials for generating web pages. For example, the data may represent portrait images of the sales agents, pictures of the items, banners, fixed sentences, and the like.

The DB 253 stores data of web pages for the online shopping service.

The DB 254 stores data of the items handled by the online shopping. The data are duplicate of those stored in the DB 231 shown in FIG. 5A. The duplication may be done at appropriate frequency so that the DB 254 has the latest data (for example, price, availability, and the like) without late.

The DB 255 stores sales data categorized into the dealing unit as well as the DB 212 shown in FIG. 3B.

The DB 256 stores data regarding to bills on the online shopping. In this embodiment, each shop issues bills to the business users even if their purchases are done by the online shopping. Therefore, managing the billing data by the in-shop terminals 11 is sufficient for billing tasks, however, the DB 256 also stores the billing data for user's reference request given through the online shopping service.

The DB 257 stores data of related items those dealt by the online shopping. The data are retrieved from the DB 233 of the master DB system 23.

The DB 258 stores electronic files representing user's manuals for the items.

The DB 259 stores data representing news retrieved from various news sources or provided by the shopping server 15. Those news materials are categorized into news categories.

Figure 8:
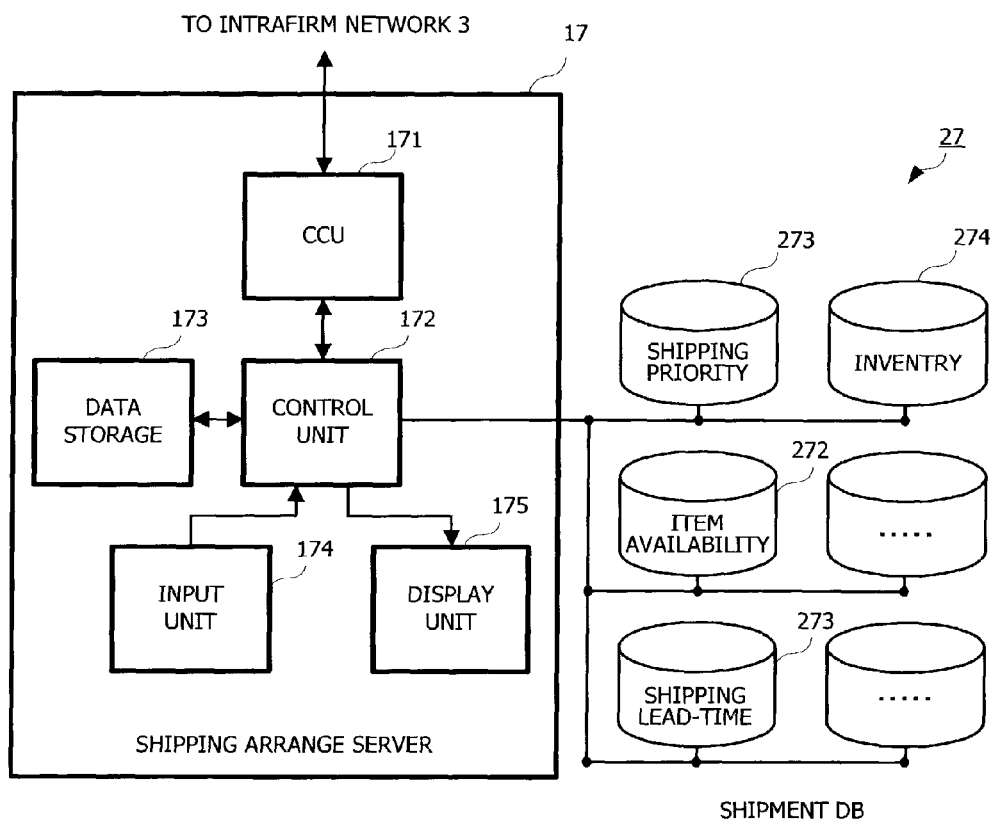
FIG. 8 is a diagram showing the structure of a set of "Shipping arrange server" and "Shipment DB system"

The shipping arrange server 17 and the shipment DB system 27 collaborate with each other to handle the orders, manage the inventory, and the like. FIG. 8 shows the structures of them.

As shown in FIG. 8, the shipping arrange server 17 comprises a communications control unit (CCU) 171, a control unit 172, a data storage unit 173, an input unit 174, and a display unit 175.

Those components except the control unit 172 have almost the same structures as those of the corresponding components in the in-shop terminal 11. The control unit 172 has the extra functions for arranging shipments, inventory management, scheduling shipments, or the like.

As shown in FIG. 8, the shipment DB system 27 has databases 271-274 each storing data of Shipping Priority, Merchandize Availability, Shipping Lead-time, and Inventory.

As shown in FIG. 9A, the DB 271 stores priority data applied to delivery centers affiliated with the merchandiser in accordance with the destination codes. The delivery arrange server 17 refers to those data to determine the appropriate delivery center based on the destination code.

As shown in FIG. 9B, the DB 272 stores data representing availability of the items at each delivery center. In FIG. 9B, the table has indicators of "Available" or "Not Available (N/A)" to show which item is available at which center.

As shown in FIG. 9C, the DB 273 stores data of shipment lead-time in accordance with the area codes. The "lead-time" shows that how many days are required for delivery (from the delivery center to the customer).

The DB 274 stores data of inventory to reveal stock status of the items. As shown in FIG. 9D, the data show stock status ("Stock Status"), stocked lot ("Lot"), schedule of next arrival ("Next Arrival"), date of next arrival ("Scheduled Date"), reserved lot at next arrival ("Reserved Lot"), and the like of each item ("Item Code"). The configuration of the stocked lot or reserved lot may depend on each delivery center.

The client terminal 31 (shown in FIG. 1) comprises an internet connectable terminal such as a personal computer. The client terminals 31 may be operated by customers of the online shopping service to access the online shopping web site given by the shopping server 15.

Operations for the system having the above described structure will now be described with reference to accompanying drawings.

The daily tasks of the sales agents in each shop are to contact the customers for merchandising, and to find new customers.

Once a new order occurs, an operator of the in-shop terminal 11 operates the in-shop terminal 11 to register data regarding to the order to the DB 212 (sales data) of the in-shop DB system 21. A unique order No. is applied to each order even if a plurality of items are ordered at once. In a case where a new customer is found, the sales agent registers data of that customer to the DB 211 (customer data). If the new customer is business user, the sales agents also input customer grade, recommended items, message to the customer, and the like.

The master server 13 constantly accesses the in-shop DB systems 23 and the shopping DB system 25, and retrieve updated data (difference) to updated the master DB system 23. For example, data representing whole sales on that day is registered to the DB 234 (sales data) by batch process during after-hours. In relation to the sales update, the master server 13 also updates customer data in the DB 232 to reflect the items (completed items) owned by the customers. The master server 13 updates the customer data in the DB 232 when modifications or additions (new customer) occur.

The master server 13 also retrieves data of customer grade, recommended items, messages, and the like from the DB 211 (customer data) in each shop, and duplicates them to the DB 251 (online user data) of the shopping DB system 25. Further, the master server 13 analyzes the updated data in the DB 234 to find out significant combinations of items those purchased at once (hereinafter, referred to as "bundled items"). The master server 13 generates "item relation data" representing the relations between the items based on the analysis. The master server 13 also generates another set of the item relation data for online shopping at the same time. Those generated sets of the item relation data are added to the DB 233 and DB 257.

Operations required to enjoy the online shopping will now be described.

A business user who intend to use the online shopping service provided by the system of this embodiment must make an application form to the shop for membership. The application form requires information regarding to purchase manager(s). The information may include at least name and user account (that is, e-mail address and password) of the purchase manager(s). The purchase manager may be officially assigned one to represent his/her company at the phase of using the online shopping. The sales agent adds customer grade and the like to the application. The customer grade may be optimized to coordinate with the services provided by each shop. The information on the written application form is transferred to an operator of the shopping server 15 to register it to the DB 251 (online user data) as shown in FIG. 7.

On the contrary, a private user who intends to use the online shopping service may operates the client terminal 31 to access a web page for user registration (sign-in) presented by the shopping server 15. The access may be established via an ISP (Internet Service Provider: not shown) and the Internet 2. The registration page requires the user to input e-mail address, address, name, payment method, and the like. After the registration is completed, the shopping server 15 issues password to the user, and registers it to the DB 251 (online user data) together with user ID.

After the above user registration process is completed, online shopping service is available. In this embodiment, the merchandiser provides the online shopping users of "your own catalog" service which allows the users to have their own customizable catalogs on the online shopping site.

Typical operations through the online shopping according to this embodiment will now be described with reference to a flowchart shown in FIGS. 10A to 10C. The flowchart represents steps for "Catalog Entry" process. The catalog entry process starts in response to the user's access.

Figure 11:
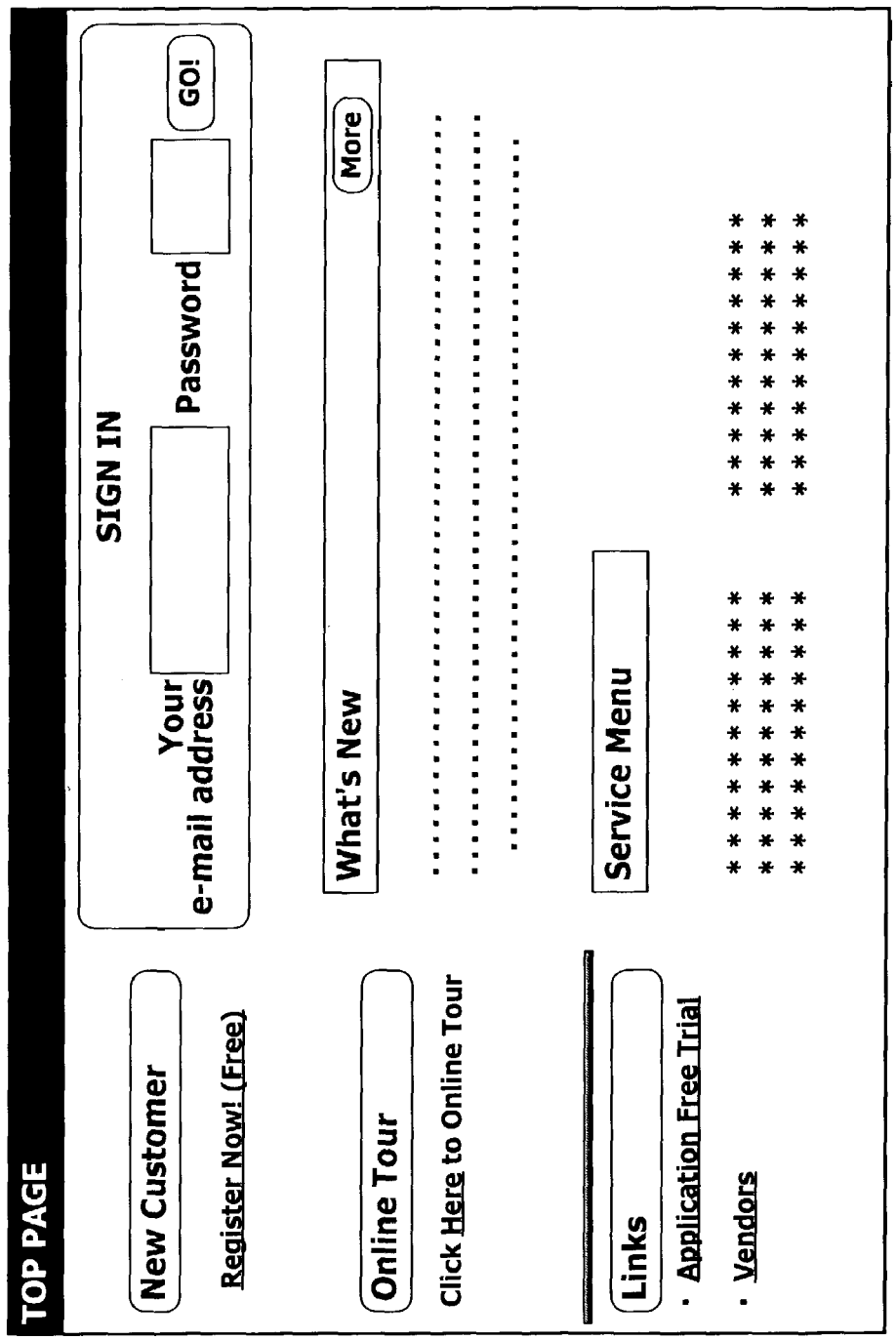
FIG. 11 is a diagram exemplifying "Top Page" to be displayed on the user terminal.

A user who has been registered to the shopping server 15 (hereinafter, referred to as "member") operates the client terminal 31 to access a member page in the online shopping site provided by the shopping server 15. In response to the access, the shopping server 15 present an ID input form page as shown in FIG. 11 as a top page (step S101).

The user inputs the login account (e-mail address and password), and the client terminal 31 transmits it to the shopping server 15. In response to reception of the login account (step S102: Yes), the shopping server 15 determines whether the access user is authorized member or not, based on the online user information in the DB 251 (step S103).

If the received login account has not been registered in the DB 251 (step S103: No), the shopping server 15 presents a sign-in page to the user terminal 31 concerned (step S1000).

On the contrary, if it is determined that the accessing user is the authorized member (step S103: Yes), the shopping server 15 retrieves the customer information of the accessing user (hereinafter, referred to as "member information") from the online user DB 251 (step S104). The shopping server 15 prepares a personalized page as shown in FIG. 12 for the member concerned, and presents it to the client terminal 31 concerned (step S105).

Figure 12:
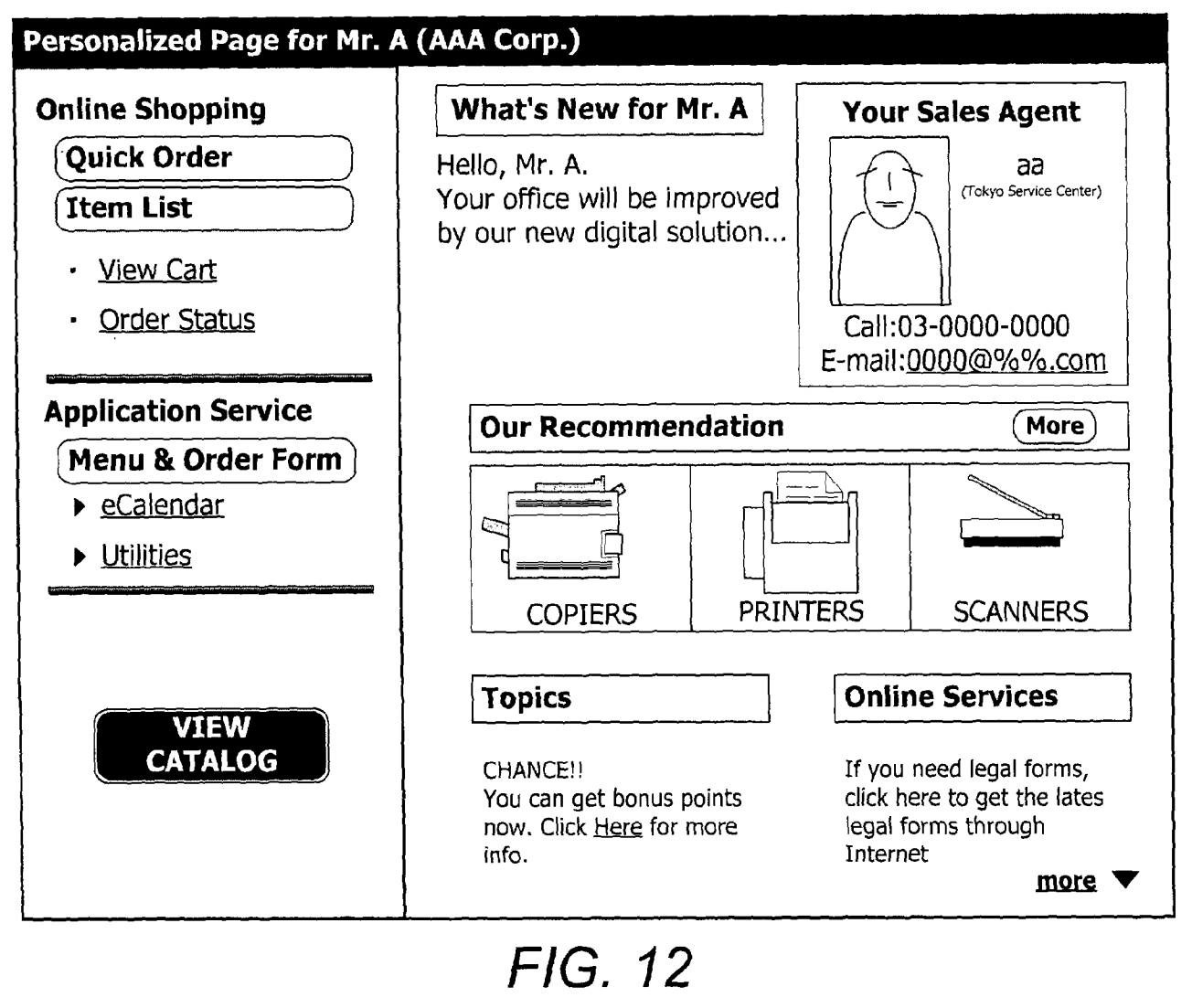

As shown in FIG. 12, the personalized page is visually divided by frames, and the left frame shows menu of the personalized site for the member concerned.

Of the contents on the left page, buttons of "Quick Link" and "Item List" are keys to start the online shopping. The user may click each of them to request the shopping server 15 to present a page for it.

In response to the request given by the user client 31 concerned (step 106: Yes; FIG. 10B), the shopping server 15 generates a menu page as shown in FIG. 13, and presents it to the client terminal 31 concerned.

If the member concerned clicks links other than the "Quick Link" and "Item List", the shopping server 15 presents other pages (step S2000).

Figure 13:
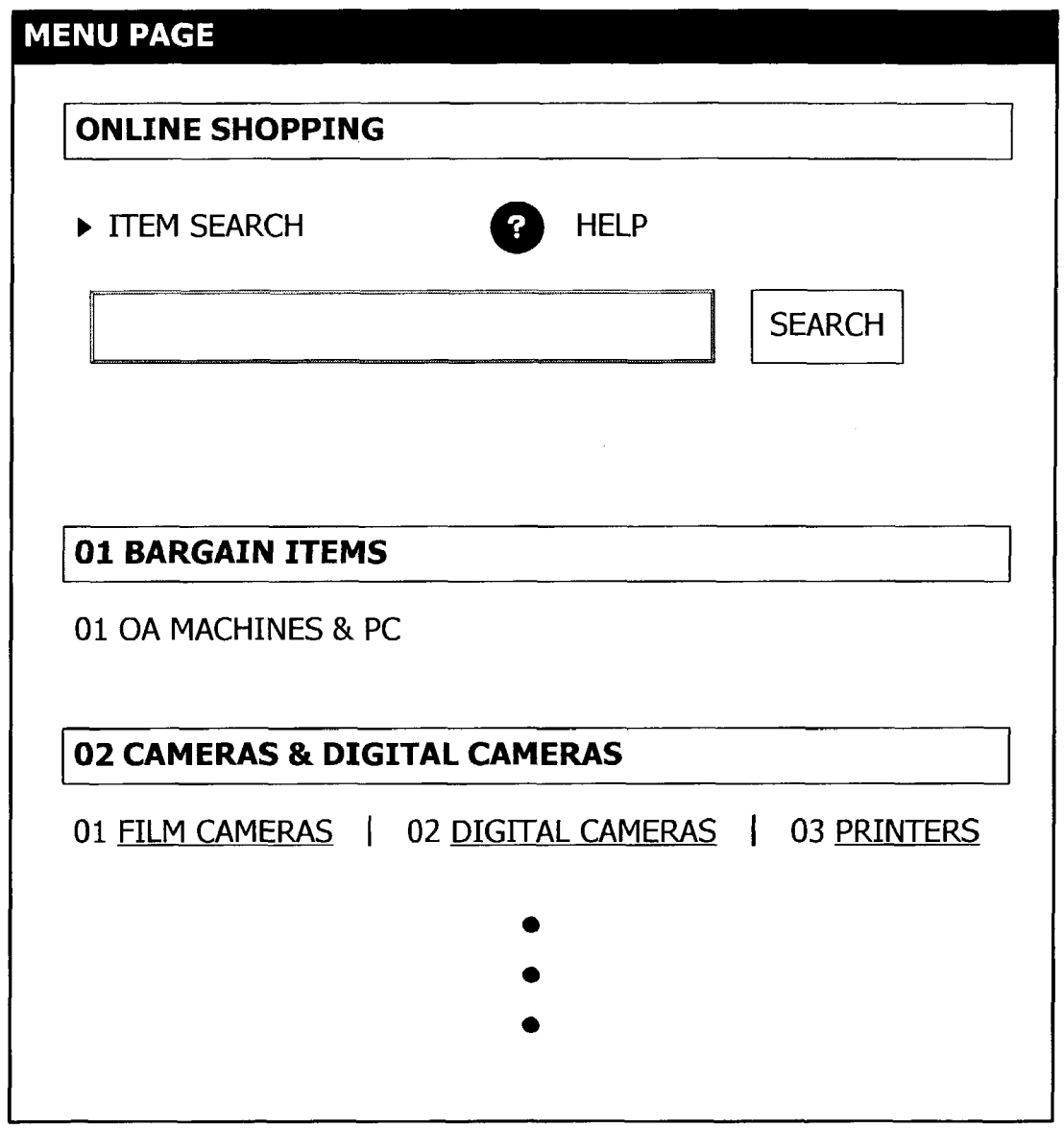
FIG. 13 is a diagram exemplifying "Menu Page" to be displayed on the user terminal.

As shown in FIG. 13, the menu page shows categories (index) and selectable subcategories (for example, "OA Machines/PC", "Film Cameras", "Digital Cameras", "Printers", and the like in FIG. 13) of the items handled. The user may select a subcategory relating to a target item to buy. The client terminal 31 requests the shopping server 15 to provide an item list page of the items in accordance with the selected subcategory.

In response to the request given by the client terminal 31 (step S108: Yes), the shopping server 15 generates an item list page as shown in FIG. 14, and presents it to the client terminal 31 concerned (step S109).

Figure 14:
FIG. 14 is a diagram exemplifying "Item List Page" to be displayed on the user terminal.

As shown in FIG. 14, the item list page shows information of the items in the selected subcategory. Each of item columns has buttons of "Details", "Options", "Supply", "Add to Cart", and the like to request the shopping server 15 to provide more information or to buy the item concerned. In addition to those buttons, each column has a check box for catalog entry. If the user wants to enter the item to the catalog, the user may check the check box of the items concerned and click "Catalog Entry" button. The client terminal 31 transmits a request for catalog entry to the shopping server 15 in accordance with the depression of "Catalog Entry" button.

In response to reception of the request (step S110: Yes), the shopping server 15 generates "Catalog Selector" page as shown in FIG. 15, and presents it to the client terminal 31 concerned (step S111 in FIG. 10C).

As shown in FIG. 15, the catalog selector page lists the items requested, and presents available catalog folders by a list box or the like. At this phase, the available folders may be "My Catalog" and "Price Watch" those handle items selected by the user arbitrary. The user may select appropriate folder on the list box, and click "Entry" button. This action causes the client terminal 31 to transmit information representing selected folder and items to be included in the selected folder (hereinafter, referred to as "catalog entry command") to the shopping server 15.

If "Cancel" button is selected, the client terminal 31 informs the shopping server 15 of it, thus, the shopping server 15 terminates the catalog entry process (step S112: No).

In response to reception of the catalog entry command, the shopping server 15 accesses the catalog folders in the online user DB 251 (step S113) to determine whether the designated item has been registered in the selected catalog folder or not (step S114).

If the item has been registered in the designated folder (step S114: No), the shopping server 15 generates a page for notifying the user that the entry has been done (step S115). The shopping server 15 proceeds the process flow back to step S111 to present the folder selector page to the client terminal 31 again.

On the contrary, if the item concerned has been unregistered in the designated folder (step S114: Yes), the shopping server 15 determines whether the selected folder is "Price Watch" or "My Catalog" (step S116).

In a case where the selected folder is "My Catalog" (step S116: No), the shopping server 15 collaborates with the master server 13 to retrieve item information of the designated items from the master DB 231, and set the retrieved information to "My Catalog" folder in the online user DB 251 (step S119). Then, the shopping server 15 terminates the catalog entry process.

On the contrary, in a case where the selected folder is "Price Watch" (step S116: Yes), the shopping server 15 asks the master server 13 the current sales prices of the designated items. The master server 13 accesses the master DB 231 to retrieve sales price data of the designated items (step S117). In this embodiment, "sales price" represents actual sales price to which discounts or the like is reflected.

The master server 13 informs the shopping server 15 of the current sales prices retrieved at step S117. The shopping server 15 generates a page for accepting the user's asking prices as shown in FIG. 16, and transmits it to the client terminal 31 concerned (step S118).

The user may operate the client terminal 31 to input asking prices and click "Entry" button. This action causes the client terminal 31 to transmit the information of the asking prices to the shopping server 15.

In response to reception of the asking price information, the shopping server 15 sets the information of the current sales price and user's asking price to "Price Watch" folder (step S119), and terminates the catalog entry process.

Figure 17:
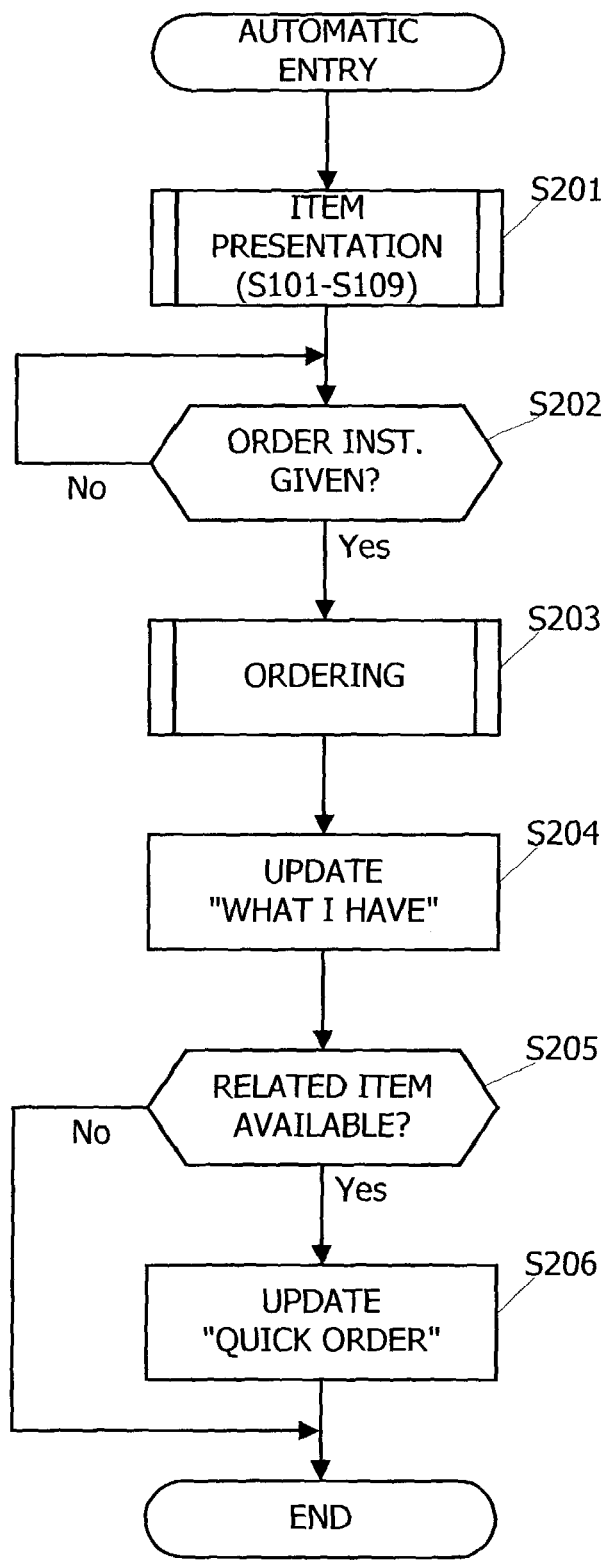
FIG. 17 is a flowchart for explaining "Automatic Entry Process"

Those are steps for the user's manual entry. The system may have automatic entry being linked with the purchase through the online shopping. In this embodiment, "Quick Order" and "What I Have" are the catalogs to be fulfilled automatically. Steps for such the automatic entry will now be described with reference to a flowchart shown in FIG. 17.

This "Automatic Entry Process" will be executed in response to the purchase action during the online shipping. That is, the shopping server 15 presents the item list page shown in FIG. 14 in accordance with steps S101 to S109 shown in FIGS. 10A and 10B (step S201).

The user operates the client terminal 31 to select desired items to buy, by clicking "Add to Cart" button on the item list page. Following to this item selection, the user clicks "View Cart" button to see the selected items for confirmation. According to this action, the shopping server 15 generates "Selected Item Page" as shown in FIG. 18, and presents it to the client terminal 31 concerned. As shown in FIG. 18, the selected item page shows the selected items concerned with their price information and the like. It also has buttons of, for example, "Continue Shopping", "Order", and "Cancel". If the user decide to buy the selected items, he/she clicks "Order" button. This action causes the client terminal 31 to transmit information representing items to buy (hereinafter, referred to as "order instruction") to the shopping server 15.

In response to reception of the order instruction (step S202: Yes), the shipping server 15 collaborates with the shipping arrange server 17 to carry out predetermined ordering tasks (step S203). The ordering tasks may include tasks for accounting, inventory check, shipping arrangement, and the like.

After those ordering tasks complete, the shopping server 15 accesses the online user DB 251 to add information of the ordered items to "What I Have" folder of the user concerned (step S204).

Then the shopping server 15 asks the master server 13 whether those ordered items have related items such as supplies, option parts, and accessories applicable to the ordered items (hereinafter, referred to as "relational items"). In response to the asking, the master server 13 accesses the master DB 233 (item relations) to determine whether relational items for the ordered items are available or not (step S205).

If there is no relational items (step S205: No), the master server 13 notifies the shopping server 15 of it. According to the notice, the shopping server 15 terminates the automatic entry process.

On the contrary, if the ordered items have the relational items (step S205: Yes), the master server 13 transmits information representing the found relational items. In response to reception of the relational item information, the shopping server 15 adds the received information to "Quick Order" folder of the user concerned (step 206), and terminates the automatic entry process. In this case, the shopping server 15 may avoid repetitional recording.

According to the above process, "What I Have" folder automatically obtains information of the items purchased through the online shopping service. Additionally, information of relational items is also registered in "Quick Order" folder. The "Quick Order" folder may accept information of frequently bought items. For example, the shopping server 15 may counts the number of ordering on the same item and by the same user. When the number exceeds predetermined threshold, the shopping server 15 adds information of the item concerned to "Quick Order" folder.

Information in the "Quick Order" folder will be viewable by the user as the "Quick Order" catalog. The catalog may also act as an order form for ordering the items included. Since the user will require those relational items as he/she uses the purchased item, the "Quick Order" catalog is helpful for the user when he/she wants to know what relational item should be used or to buy them.

Figure 19A:
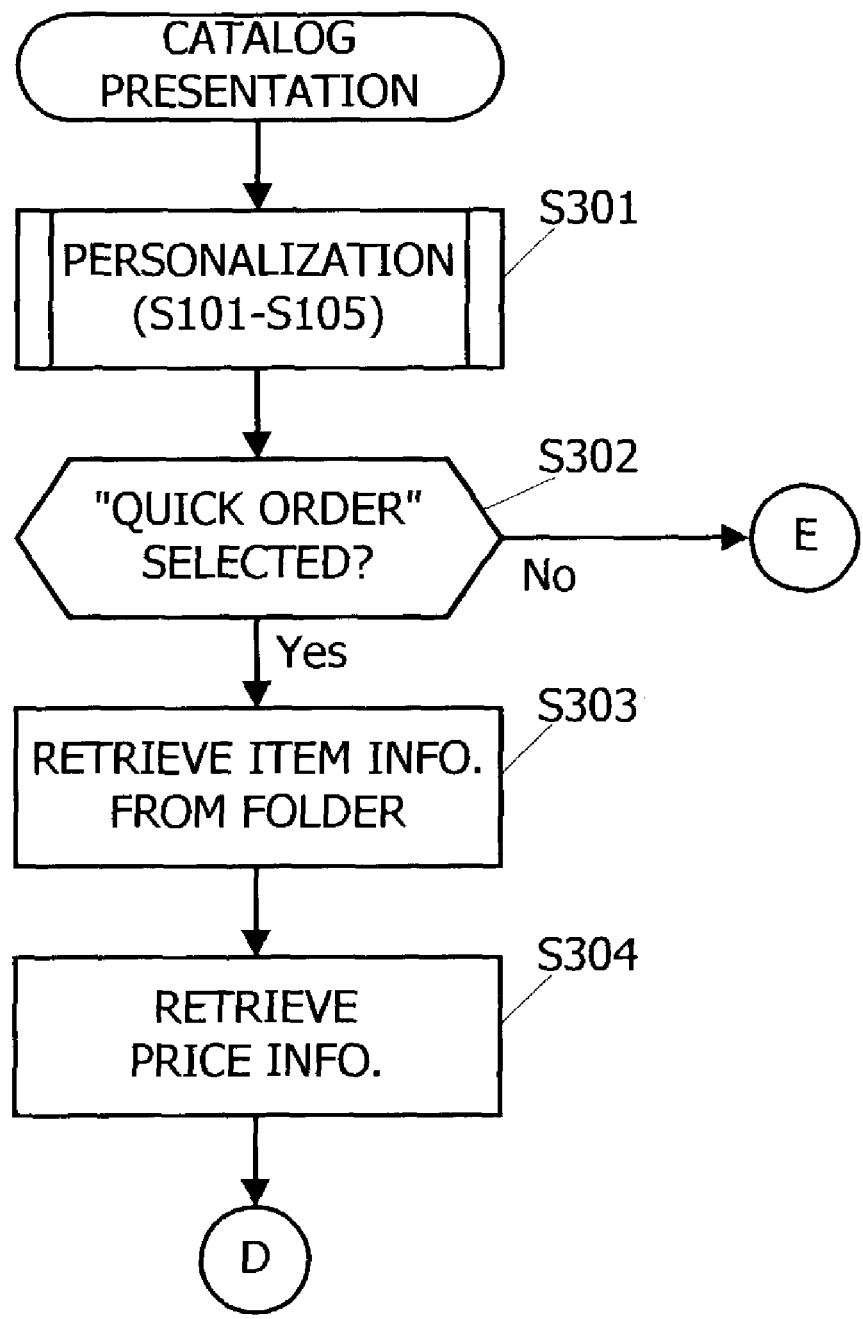
FIG. 19A is a flowchart for explaining the first half of "Catalog Presentation Process"
Figure 19B:
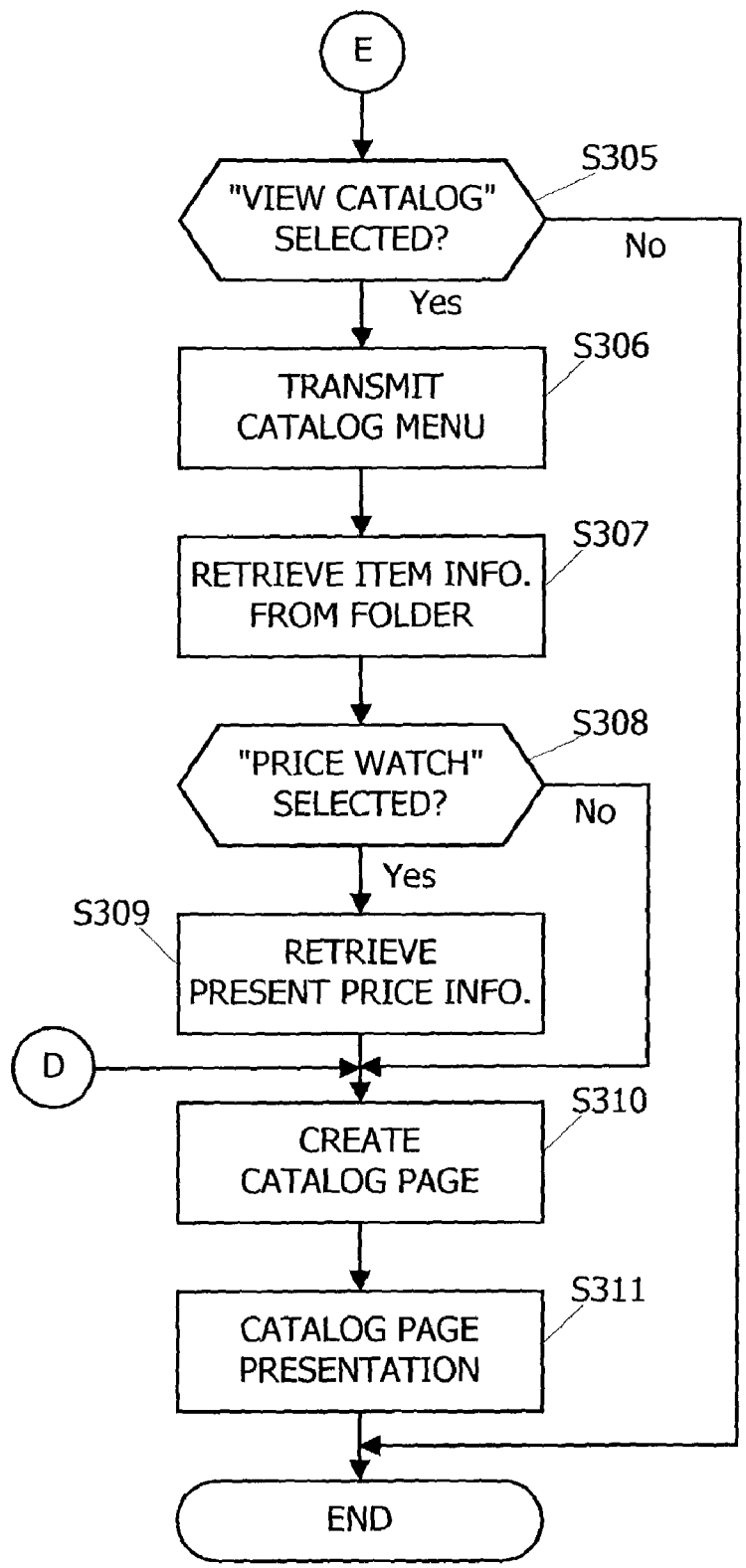
FIG. 19B is a flowchart for explaining the second half of "Catalog Presentation Process"

Steps for presenting thus fulfilled catalogs to the user (member) will now be described with reference to a flowchart shown in FIGS. 19A and 19B.

Figure 10A:
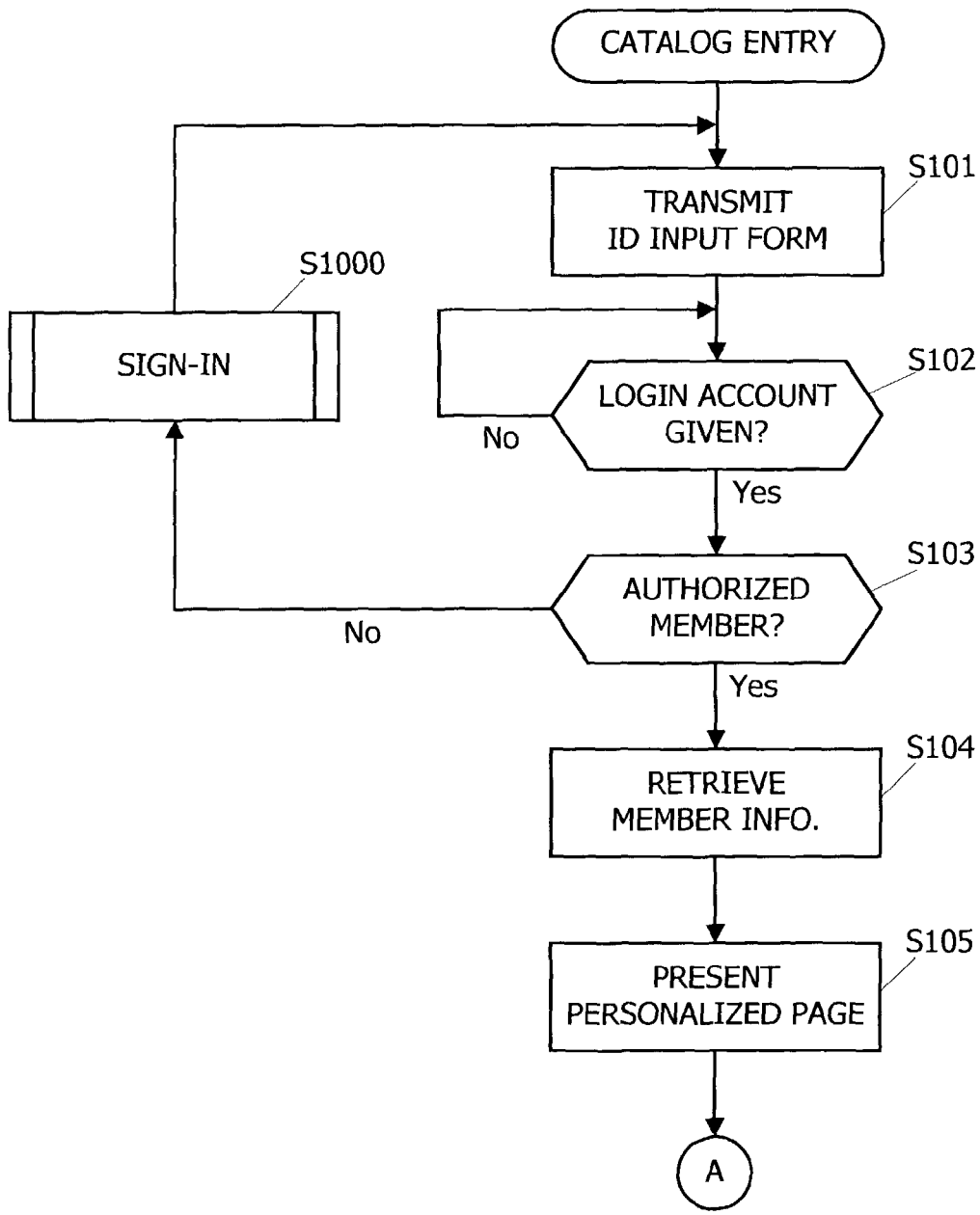
FIG. 10A is a flowchart for explaining early stages of "Catalog Entry Process"
Figure 10B:
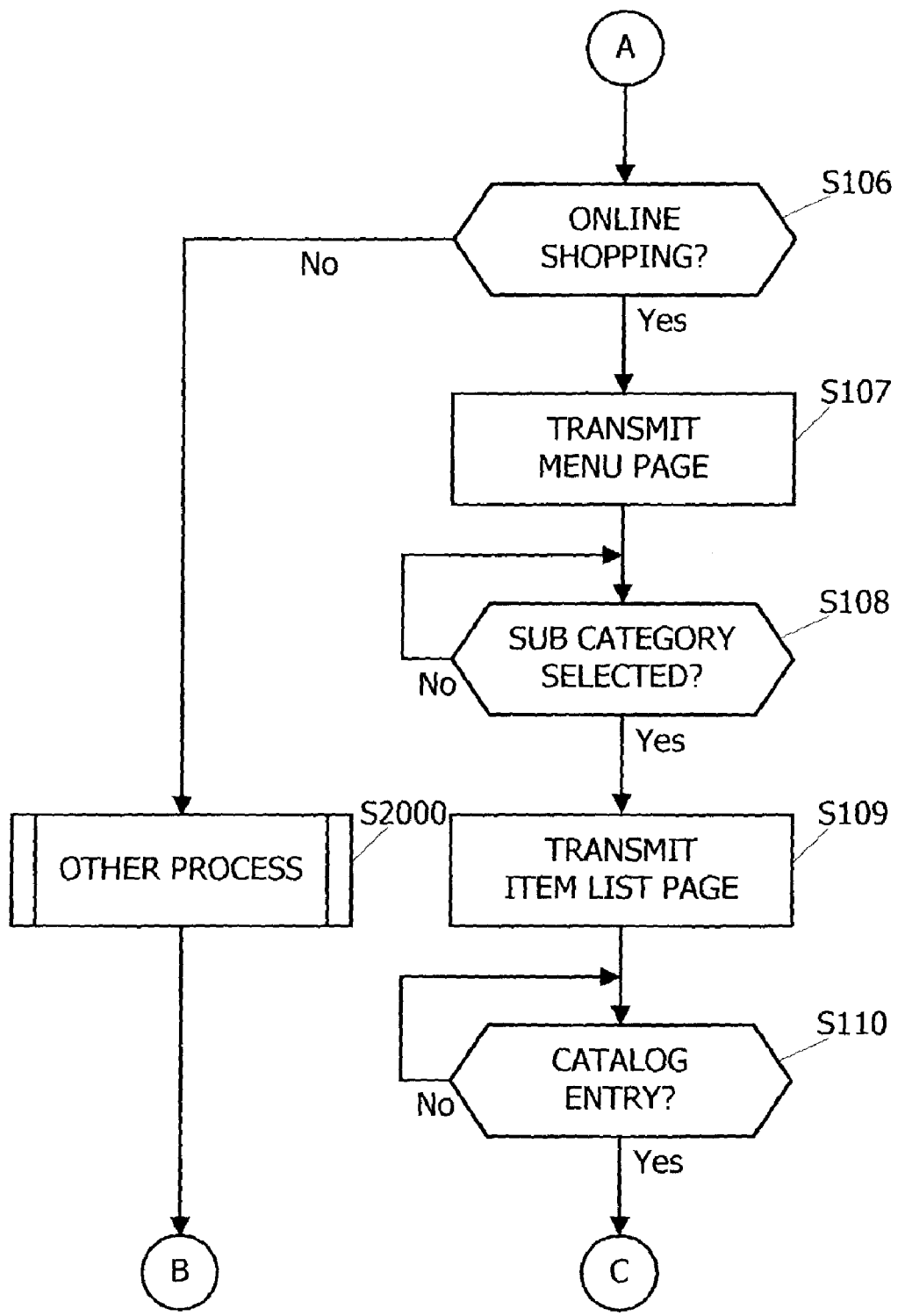
FIG. 10B is a flowchart for explaining middle stages of "Catalog Entry Process"
Figure 10C:
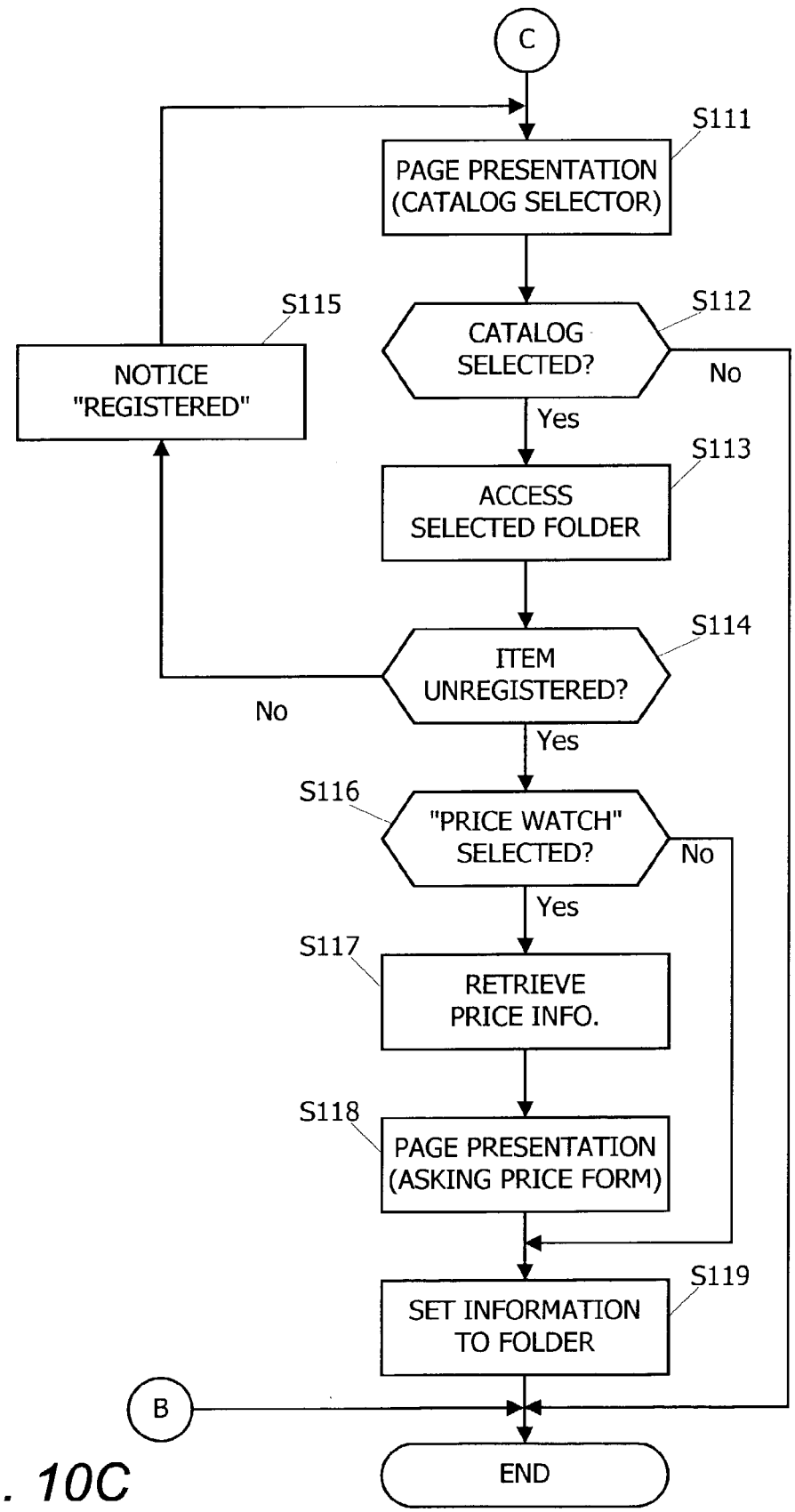
FIG. 10C is a flowchart for explaining last stages of "Catalog Entry Process"

In response to access by the client terminal 31, the shopping server 15 presents the personalized page as shown in FIG. 12 to the client terminal 31 concerned in accordance with steps S101 to S105 shown in FIG. 10A (step 301).

As shown in FIG. 12, the leftward frame of the personalized page has buttons of "Quick Order" and "View Catalog". If the user wants to see his/her own catalog, he/she may click one of them.

Once the "Quick Order" button is clicked, the client terminal 31 requests the shopping server 15 to present the "Quick Order" catalog.

In response to the request from the client terminal 31 (step S302: Yes), the shopping server 15 accesses the online user DB 251 to retrieve the item information being stored in the folders of "What I Have" and "Quick Order" for the user concerned (step S303).

Then the shopping server 15 accesses the item information DB 254 to retrieve the latest price information of the items in "Quick Order" (step S304).

The shopping server 15 generates a catalog page including information retrieved at steps S303 and S304, that is, item information in "Quick Order" folder and price information of those items (step S310). The shopping server 15 presents the generated catalog page to the client terminal 31 concerned (step S311), and terminates the catalog presentation process.

FIG. 21 exemplifies the catalog page in case of "Quick Order" was selected. As shown in FIG. 21, the catalog page for "Quick Order" (hereinafter, referred to as "Quick Order page") shows items owned by the user ("Your Possession" in FIG. 21) and accessories or supplies related to them (relational items). Information of "Your Possession" was retrieved from "What I Have" folder, and of "Accessories/Supplies" was retrieved from "Quick Order" folder. And the Quick Order page also shows prices of the relational items those retrieved from the item information DB 254.

The Quick Order page has check boxes and text boxes corresponding to the shown relational items to allow the user to select one(s) to buy with designating order quantities. That is, if the user intends to buy those relational items, he/she may check the desired ones, input quantities, and click "Buy Now" button. This sequence causes the client terminal 31 to transmit information representing the selected items, quantities, and order instruction, to the shopping server 15. The shopping server 15 may carry out ordinary ordering tasks in response to the instruction given by the client terminal 31 concerned.

In conclusion, "Quick Order" catalog includes sub items such as accessories or supplies related to main items owned by the user. Information of those sub items is automatically registered in the "Quick Order" folder when the main items are purchased. Thus registered information will be presented to the user when the user just clicks "Quick Order" button on the top page. Further, the "Quick Order" catalog also includes frequently bought items. Therefore, the user is released from searching tasks when he/she wants to buy them. As a result, the user can save time and cost for purchasing the necessary items or frequently buying items.

On the contrary, if the user choose "View Catalog" through the top page (step S302: No, step S305: Yes), the client terminal 31 requests the shopping server 15 to provide "Catalog Menu Page".

Figure 20:
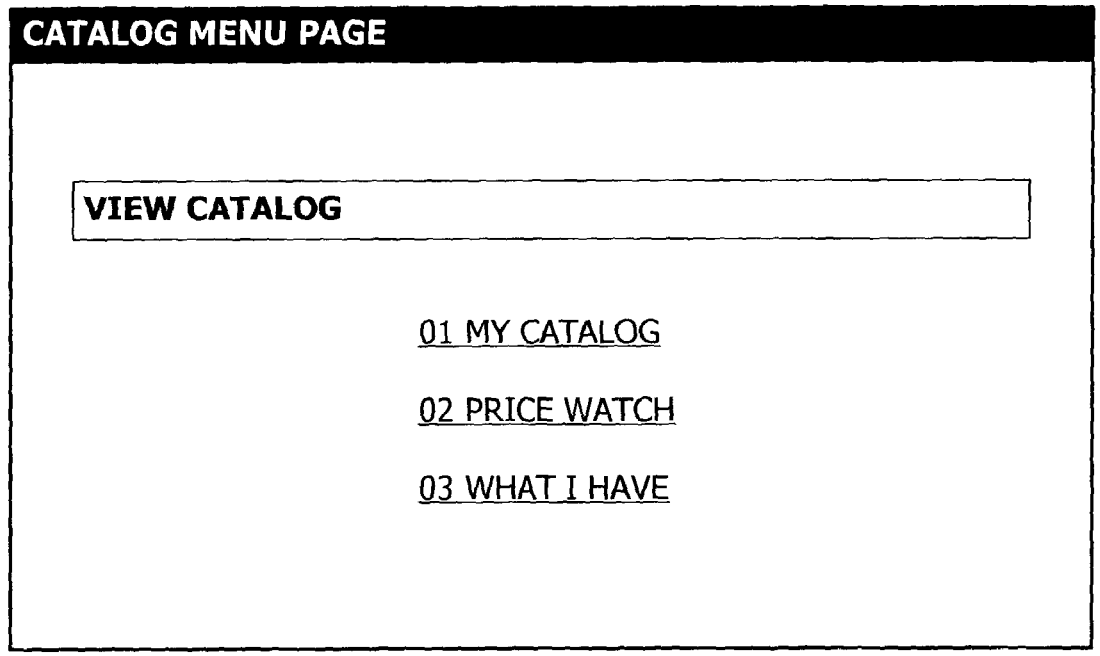
FIG. 20 is a diagram exemplifying "Catalog Menu Page" to be displayed on the user terminal.

In response to the request, the shopping server 15 generates "Catalog Menu Page" as shown in FIG. 20, and presents it to the client terminal 31 concerned (step S306).

As shown in FIG. 20, "Catalog Menu Page" shows a menu including catalog folders prepared in the record of the user concerned in the online user DB 251.

The user operates the client terminal 31 to select desired catalog through the "Catalog Menu Page". According to this action, the client terminal 31 request the shopping server 15 to provide the catalog desired by the user.

In response to the request, the shopping server 15 retrieves information in the folder corresponding to the requested catalog (step S307).

In a case where the selected catalog is "Price Watch" (step S308: Yes), the shopping server 15 further accesses the item information DB 254 to retrieve current price data for the items in "Price Watch" folder (step 309).

The shopping server 15 generates an appropriate catalog page including information retrieved through steps S307 and S309 (step S310). The shopping server 15 presents thus generated catalog page to the client terminal 31 concerned (step S311), and terminates the catalog presentation process.

FIG. 22 shows an example of "Price Watch" catalog. As shown in FIG. 22, "Price Watch" catalog shows target items set and asking prices set by the user. These were retrieved from "Price Watch" folder. The catalog also shows current prices of those target items retrieved from the item information DB 254. Accordingly, the user can compare his/her asking prices with the current prices (for example, actual sales prices). As well as the quick order catalog, "Price Watch" catalog also has check boxes and text boxes. That is, if the user determines to buy the target item(s) after the comparison, he/she may check the desired one(s) with designating desired quantity, and click "Buy Now" button. Then an order instruction will be sent to the shopping server 15 immediately. The shopping server 15 will carry out the ordinary ordering tasks, and the purchase will be completed.

FIG. 23 exemplifies "What I Have" catalog (purchase history). As shown in FIG. 23, the catalog lists items owned by the user in, for example, historical order. Each column has some articles titled "Details", "Supplies", "Options", "User Support", "User's Manual", "Tips", "Upgrade", and the like. Those are linked to web pages or document files related to the titles respectively. Those related web page or document files may reside in the appropriate databases in the shopping DB system 25, and the like. That is, the user can obtain useful or helpful information regarding to his/her possession without troublesome tasks such as searching.

Figure 24:
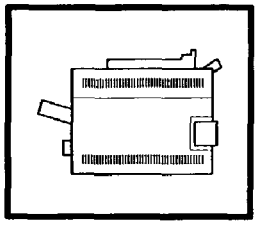
FIG. 24 is a diagram exemplifying "Catalog Page (My Catalog)" to be displayed on the user terminal.

FIG. 24 shows an example of another one "My Catalog". As shown in FIG. 23, "My Catalog" shows information of the items arbitrary assigned by the user through the catalog entry process. Each column has some buttons titled "Description", "Price", "User's Manual", "Add to Cart", and the like. As well as the what I have catalog, those buttons are also linked to appropriate web pages or document files related to the titles respectively. "My Catalog" may be useful for a user who wants to compare similar items with each other before he/she selects one to buy, because he/she can know features, prices, how to use, and the like of the target items before buying. "My Catalog" also indicates important notice regarding to the items such as inventory status (ex. "Sold Out"), sales schedule (ex. "Reservation Acceptable"), manufacturer's notice (ex. "Production Stopped"). Accordingly, the user can obtain useful or helpful information regarding to the target items designated by the user without spending time and cost.

According to the first embodiment described above, the system presents the user's personal catalogs having various categories in accordance with the user's various purposes. Since each of the users is allowed to select items arbitrary, they can make their own catalogs. Moreover, the system has the automatic catalog entry process being connected with the user's purchase action. Thus, the users are released from troublesome tasks, while useful and helpful information is available without spending time and cost.

Second Embodiment

In the first embodiment above, the catalogs are displayed separately. Those catalogs may be displayed on the same page in order to improve useablity. Such the advanced display technique will now be described as a second embodiment of the present invention.

Figure 25A:
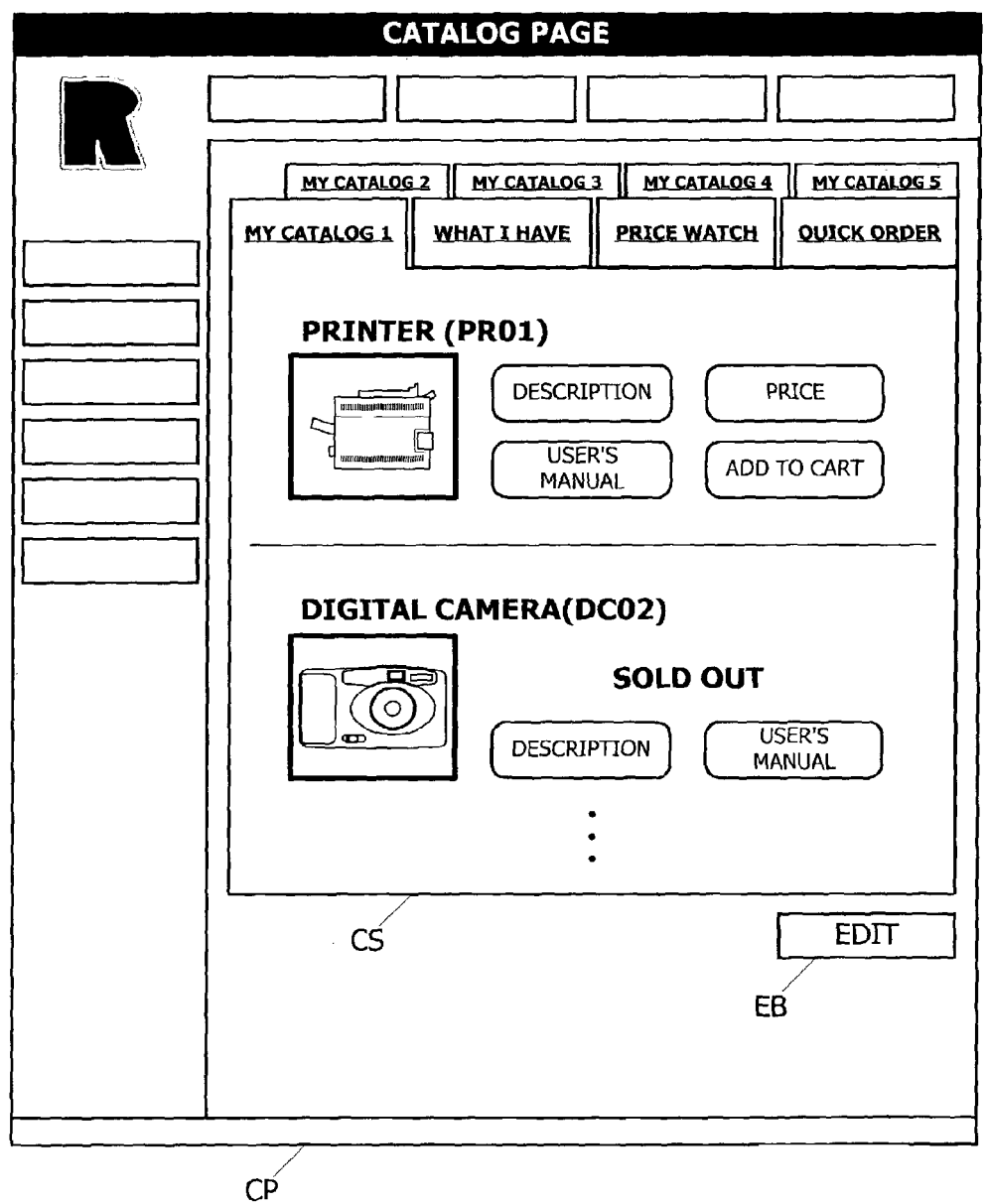
FIG. 25A is a diagram exemplifying "Catalog Page (My Catalog)" to be displayed on the user terminal, according to a second embodiment of the present invention.

FIG. 25A shows an example of "Catalog Page" (hereinafter, referred to as "catalog page CP") which is able to show the plurality of catalogs with one page. The catalog page CP may be presented to the client terminal 31 when the "View Catalog" button is clicked through the personalized page (FIG. 12).

As shown in FIG. 25A, the catalog page CP has a catalog sheet CS including a plurality of the catalogs. The catalog sheet CS may be a set of plural switchable layered sheets. The catalogs are assigned to the sheets one by one, and each sheet has a clickable tab indicating a title of the assigned catalog. The catalogs may be the same as those described in the first embodiment, that is, "Quick Order", "Price Watch", "What I Have", and "My Catalog". The user clicks appropriately-labeled tab to get to the desired catalog. That is, the sheet corresponding to the clicked tab is switched to a visible top sheet (hereinafter, referred to as "active sheet"). FIG. 25A shows an example where "My Catalog 1" is selected.

As shown in FIG. 25A, "My Catalog" may has a plurality of categories (for example, "My catalog 1" to "My Catalog 5" as shown). Such the categorization depends on the user's own decision. If the user sets arbitrary categories, folders corresponding to them are prepared in the online user DB 251 immediately.

FIG. 25B shows an example where "Quick Order" catalog has been switched to the active sheet. As well as the first embodiment, "Quick Order" catalog shows relational items applicable to the user's possession or frequently bought items with check boxes and text boxes for order. As shown in FIG. 25B, the catalog sheet CS of the "Quick Order" has "Order" button. If the user intends to buy the items on the catalog, he/she may checks the desired items, input quantity, and click "Order" button. According to those actions, the designated item(s) are ordered to the shopping server 15, and the shopping server 15 will carry out predetermined shipping tasks.

As shown in FIGS. 25A and 25B, each catalog sheet CS has an edit button ED which enables the user to customize his/her catalogs. The customization may be duplication of data among the catalogs.

Figure 25C:
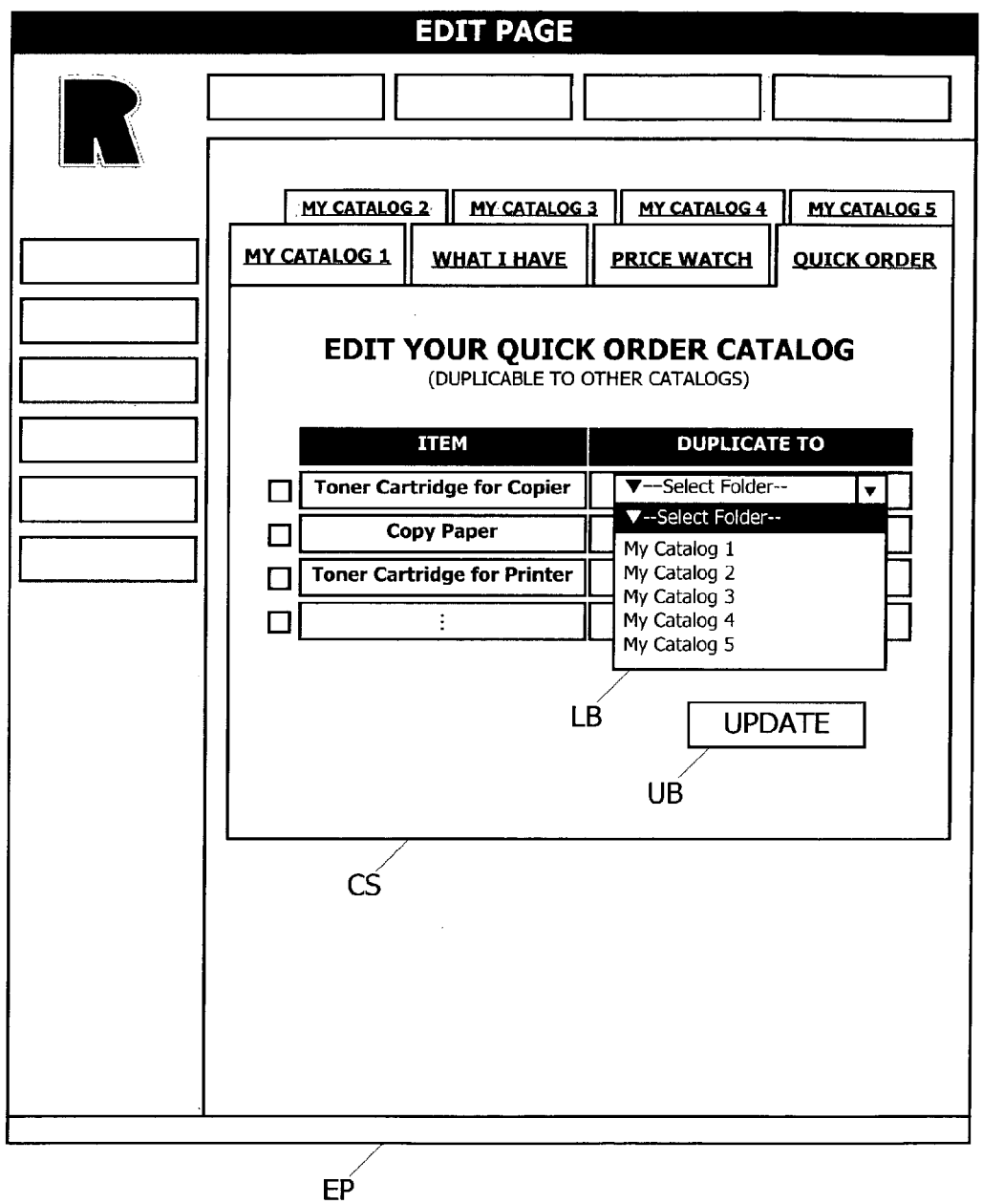
FIG. 25C is a diagram exemplifying "Edit Page" to be displayed on the user terminal, according to a second embodiment of the present invention.

FIG. 25C exemplifies an edit page EP which will appear after the edit button ED is clicked. As shown in FIG. 25C, the edit page EP has a list box LB to select destination catalog. If the user intends to customize the catalog, he/she may select destination catalog from the list box LB, and click update button UB. Those actions causes the client terminal 31 to request the shopping server 15 to modify the catalog folders in accordance with the instruction. The shopping server 15 modifies the catalog folders of the user concerned immediately.

Since item entry for "Quick Order" catalog is done automatically as described above, the data in "Quick Order" folder are untouchable by the user. However, the user is allowed to duplicate the contents in "Quick Order" catalog to the other catalog, thus, the "Quick Order" catalog is also customizable substantially. Such the option is useful for the users, because their catalogs are flexibly customizable in accordance with their purposes, thus, the useablity of the system improves.

Various embodiments and changes may be made thereunto without departing from the broad spirit and scope of the invention. Though the above embodiment exemplifies the collaboration of the system for merchandising the goods at the shops with another for the online shopping, the target merchandises are not limited to the goods. For example, the online shopping system may collaborate with a system handling digital contents (images, music, and the like), service, or the like.

Arbitrary modifications onto the configurations of the servers or databases may be also allowed. Though the above embodiment exemplifies that each shop has a single in-shop terminal 11 as shown in FIGS. 1 and 2 for comprehensive description, a plurality of the in-shop terminals 11 may be installed in a shop. Those terminals may collaborate with each other via LAN. Each of the master server 13 and the shopping server 15 may include several server machines those collaborate with each other. The configurations of the databases may also accept arbitrary modifications. For example, integration of some databases works as a database for single purpose, or a single database may be functionally divided into some databases for different purposes. Though the servers or the databases share the similar data in the above embodiment, such the data may be omitted or simplified. For example, instead of entering item relations information to the DB 233 (item relations), the relationship may be determined based on the item data stored in the DB 231 of the master DB system 23.

Or, the DB 233 (item relations) may be omittable. In this case, process regarding to the item relations may be handled with using the item data in the DB 257. In the same manner, the link information in the master DB system 23 may be omittable, while registering such the information only to the shopping DB system 25.

As for "Price Watch" catalog, the shopping server 15 may constantly obtain the current sales price information of the items set in the "Price Watch" folder, and compare the current sales prices with the asking prices set by the users. If the shopping server 15 finds out items whose sales prices are equal to or close to the user's asking prices in accordance with predetermined allowable ranges of the differences, the shopping server 15 may notify the users concerned of it by e-mail or the like. In this case, the e-mail may show URL indicating the "Price Watch" catalog for the user concerned.

As described above, the present invention realizes the online merchandising system which allows the users to have their own catalogs on the online shopping site.

The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2002-014810 filed on Jan. 23, 2002 and Japanese Patent Application No. 2002-337249 filed on Nov. 20, 2002, and including specification, claims, drawings and summary. The disclosure of the above Japanese Patent Application is incorporated herein by reference in its entirety.

What is claimed is:

1. An online merchandising system for an online shopping service using a telecommunications network comprising:

an item information storage for storing information of items to be merchandised;

a bundle information storage for storing information representing relations between a main item stored in said item information storage and other sub items which should be bundled with the main item;

a customer information storage for storing customer information including identification data of users of the online shopping service and data representing at least items designated and/or being owned by each of the users;

an item information presenter for presenting the item information stored in said item information storage the users of the online shopping service via said telecommunications network;

a catalog generator for generating user's own electronic catalogs based on the information stored in said item information storage, said bundle information storage and said customer information storage;

a catalog presenter for presenting the electronic catalog to the user concerned via said telecommunications network; and an order receptor for receiving order instructions from the user through the electronic catalog presented by said catalog presenter, wherein, said item information presenter:

accepts users' designations of items and asking prices of the items via said telecommunications network;

constantly obtains current actual sales prices information of the items designated by the user;

compares the obtained current actual sales prices with the users' asking prices to detect whether the obtained current actual sales price is equal to or close to the user's asking price in accordance with a predetermined allowable range of a difference therebetween, said catalog generator generates multiple catalogs for each user showing both the current actual sales prices and the user's asking prices so as to be comparable with each other on a same page and so as to enable a user to order the item by the user's operation, said catalog presenter sends to the user concerned an email including a direct linkage to the catalog generated by said catalog generator when said item information presenter detects that the difference between the current actual sales price and the asking price is within the predetermined range and presents the multiple catalogs so as to be switchable by the user concerned, said order receptor adds an item ordered through the presented catalog to the data stored in said customer information storage as item being owned by the user concerned so that said catalog generator generates a different user's own catalog showing items being owned by the user concerned and having a linkage to information relating to each of the shown items, and, contents of the user's own catalog are customizable by duplicating contents of the user's own catalog on different user's catalogs selected from a list by the user.

2. The online merchandising system according to claim 1, wherein, said catalog generator generates the user's own catalogs including information of the items designated by the user concerned.

3. The online merchandising system according to claim 1, wherein said catalog generator generates the user's own catalogs including information of the items in accordance with the purchase history of the user concerned.

4. An online catalog presenting method being applicable to an online shopping service, comprising the steps of:

storing information of items being handled by the online shopping service; storing information representing relations between a main item represented by the stored item information and other sub items which should be bundled with the main item;

storing customer information including identification data of users of the online shopping service and data representing at least items designated and/or being owned by each of the users;

selecting items regarding to the users of the online shopping service from the stored items information;

accepting user's designation of item and asking prices of the items concerned via said telecommunications network;

constantly obtaining current actual sales prices of the items designated by the user;

comparing the obtained current actual sales prices with the users' asking prices to detect whether the obtained current actual sales price is equal to or close to the user's asking price in accordance with predetermined allowable range of the difference therebetween;

generating multiple catalogs based on the stored information, personalized for each of the users to show information of the selected items with both the current actual sales prices and the user's asking prices so as to be comparable with each other;

presenting the generated catalogs to the users via a telecommunications network, so that multiple catalogs are switchable by the user and the items shown in the presented catalog are purchasable by the user through the online shopping service, and notifies the user that the sales price is close to the asking price when it is detected that the difference between the current actual sales price and the asking price being within the predetermined range by an email including a direct linkage to the generated catalog showing both the current actual sales prices and the asking prices, receiving order instructions from the user through the presented electronic catalog and adding item ordered through the presented catalog to the customer information as item being owned by the user concerned so that said catalog generator generates a different user's own catalog showing items being owned by the user concerned having linkage to information relating to each of the shown items, and, contents of the user's own catalog are customizable by duplicating contents of the user's own catalog on different user's catalogs selected from a list the user.

5. The method according to claim 4 further comprising the step of detecting purchase history of each user, and
said selecting step selects the items purchased by the user concerned through the online shopping service.

6. The method according to claim 4 further comprising the steps of:
detecting what items being owned by the users; and
finding relations among the items handled by the online shopping service, and
said selecting step selects the items relating to the items owned by the user concerned.

7. The method according to claim 4 further comprising the step of detecting purchase history of each user, and
said selecting step selects items frequently purchased by the user concerned.

8. The method according to claim 4, wherein,
said selecting step selects the items in accordance with designation given by the user concerned via said telecommunications network.

9. the method according to claim 4 further comprising the step of updating stored item information, and
said generating step generates the catalogs based on the updated item information.

10. The method according to claim 4, wherein,
said presenting step presents the catalogs to the user so that the contents of the catalogs are exchangeable with each other by the user.

11. A server applicable to a provider of an online shopping service using a telecommunications network, comprising:
an item information storage which stores information of items to be handled by the online shopping service;
a bundle information storage which stores information representing relations between a main item stored in said item information storage and other sub items which should be bundled with the main item;
a customer information storage which stores customer information including identification data of users of the online shopping service and data representing at least items designated and/or being owned by each of the users;
a users' instruction accepting unit which accepts users' instructions given by user terminals of the users of the online shopping service via said telecommunications network, an item selecting unit which selects items regarding to users from the items represented by the information stored in said item information storage;
a selected item memory which stores information of the items selected by said item selecting unit with categorizing the information by the users;
a catalog generating unit which generates personalized electronic catalogs based on the information stored in said item information storage, said bundle information storage and said customer data storage to be presented to the users through the online shopping service, showing items represented by the information stored in said selected item memory; and
a catalog presenting unit which presents the personalized catalogs generated by said catalog generating unit to said user terminal concerned via said telecommunications network, so as to enable the user concerned to order the items shown in the presented catalog through the online shopping service; and
an order receiving unit which receives order instructions from the user through the electronic catalog presented by said catalog presenting unit, wherein, said item information storage constantly updates the item information therein so that the item information represents current sales prices of the items, said user's instruction accepting unit accepts users' designations of items and asking prices of the items via said telecommunications network, said item selecting unit:
constantly obtains the current actual sales prices of the items designated by the user;
compares the obtained current actual sales prices with the user's asking prices to detect whether the obtained current actual sales price is equal to or close to the user's asking price in accordance with a predetermined allowable range of the difference therebetween,
said catalog generator generates multiple catalogs for each user showing both the current actual sales prices and the user's asking prices so as to be comparable with each other on a same page and so as to enable a user to order the item by the user's operation, and
said catalog presenting unit sends to the user concerned an email including a direct linkage to the catalog generated by said catalog generator when said item information presenter detects that the difference between the current actual sales price and the asking price is within the predetermined range and presents the multiple catalogs so as to be switchable by the user concerned, and
said order receiving unit adds an item ordered through the presented catalog to the data stored in said customer information storage as an item being owned by the user concerned so that said catalog generator generates a different user's own catalog showing items being owned by the user concerned and having a linkage to information relating to each of the items shown, and
contents of the user's own catalog are customizable by duplicating contents of the user's own catalog on different user's catalogs selected from a list the user.

12. The server according to claim 11 further comprising a purchase detecting unit which detects purchases of the users through the online shopping service, wherein,
said item selecting unit selects items in accordance with the purchases of the users detected by said purchase detecting unit, and
said catalog generating unit generates a personalized catalog showing purchase history of the user concerned.

13. The server according to claim 11 further comprising:
a possession detecting unit which detects what items owned by the users; and
an item linking unit which links items with relational items in said item information storage, wherein,
said catalog generating unit generates a personalized catalog showing the relational items linked to the items owned by the user concerned.

14. The server according to claim 11, wherein
said item information storage constantly updates the item information therein,
said selected item memory updates the selected item information in accordance with the update by said item information storage, and
said catalog generating unit generates the personalized catalogs showing the latest item information.

15. The server according to claim 11, wherein
said catalog presenting unit presents the personalized catalogs to the terminal devices of the users so that the contents of the catalogs are customizable by the users, and
said selected item memory further categorizes the information into plural kinds of the catalogs to be generated by said catalog generating unit, and updates the information in accordance with the customization by the users.

16. The server according to claim 11, wherein,
said users' instruction accepting unit accepts a user's order instruction through the catalog presented by said catalog presenting unit, and
said selected item memory updates the selected item information in accordance with the order instruction accepted by said users' instruction accepting unit.

17. A computer program product storing a program which functions a computer as an online merchandising server for providing a online shopping service via a telecommunications network, comprising:
an item information storage which stores information of items to be handled by the online shopping service;
a bundle information storage which stores information representing relations between a main item stored in said item information storage and other sub items which should be bundled with the main item;
a customer information storage which stores customer information including identification data of users of the online shopping and data representing at least items designated and/or being owned by each of the users;
a users' instruction accepting unit which accepts users' instructions given by user terminals of the users of the online shopping service via said telecommunications network, an item selecting unit which selects items regarding to users from the items represented by the information stored in said item information storage;
a selected item memory which stores information of the items selected by said item selecting unit with categorizing the information by the users;
a catalog generating unit which generates personalized electronic catalogs based on the information stored in said item information storage, said bundle information storage and said customer data storage to be presented to the users through the online shopping service, showing items represented by the information stored in said selected item memory; and
a catalog presenting unit which presents the personalized catalogs generated by said catalog generating unit to said user terminal concerned via said telecommunications network, so as to enable the user concerned to order the items shown in the presented catalog through the online shopping service, and an order receiving unit which receives order instructions from the user through the electronic catalog presented by said catalog presenting unit, wherein, said item information storage constantly updates the item information therein so that the item information represents current sales prices of the items, said user's instruction accepting unit accepts users' designations of items and asking prices of the items via said telecommunications network, said item selecting unit:
constantly obtains the current actual sales prices, of the items designated by the user;
compares the obtained current actual sales prices with the user's asking prices to detect whether the obtained current actual sales price is equal to or close to the user's asking price in accordance with predetermined allowable range of the difference therebetween,
said catalog generator generates multiple catalogs for each user showing both the current actual sales prices and the user's asking prices so as to be comparable with each other on a same page and so as to enable a user to order the item by the user's operation, and
said catalog presenting unit sends to the user concerned an email including a direct linkage to the catalog generated by said catalog generator when said item information presenter detects that the difference between the current actual sales price and the asking price is within the predetermined range and presents the multiple catalogs so as to be switchable by the user concerned, and
said order receiving unit adds an item ordered through the presented catalog to the data stored in said customer information storage as an item being owned by the user concerned so that said catalog generator generates a different user's own catalog showing items being owned by the user concerned and having a linkage to information relating to each of the items shown, and
contents of the user's own catalog are customizable by duplicating contents of the user's own catalog on different user's catalogs selected from a list by the user.

* * * * *